(12) United States Patent
Liu et al.

(10) Patent No.: US 11,201,713 B2
(45) Date of Patent: Dec. 14, 2021

(54) TERMINAL APPARATUS, BASE STATION APPARATUS, AND COMMUNICATION METHOD

(71) Applicants: SHARP KABUSHIKI KAISHA, Sakai (JP); FG Innovation Company Limited, Tuen Mun (HK)

(72) Inventors: Liqing Liu, Sakai (JP); Shoichi Suzuki, Sakai (JP); Wataru Ouchi, Sakai (JP); Tomoki Yoshimura, Sakai (JP); Taewoo Lee, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 23 days.

(21) Appl. No.: 16/771,110

(22) PCT Filed: Dec. 13, 2018

(86) PCT No.: PCT/JP2018/045909
§ 371 (c)(1),
(2) Date: Jun. 9, 2020

(87) PCT Pub. No.: WO2019/117253
PCT Pub. Date: Jun. 20, 2019

(65) Prior Publication Data
US 2020/0374088 A1 Nov. 26, 2020

(30) Foreign Application Priority Data
Dec. 13, 2017 (JP) .............................. JP2017-238476

(51) Int. Cl.
*H04L 5/00* (2006.01)
*H04L 1/16* (2006.01)
*H04W 72/04* (2009.01)

(52) U.S. Cl.
CPC .............. *H04L 5/0055* (2013.01); *H04L 1/16* (2013.01); *H04L 5/001* (2013.01); *H04W 72/0413* (2013.01)

(58) Field of Classification Search
CPC ......... H04L 5/0055; H04L 1/16; H04L 5/001; H04W 72/0413
See application file for complete search history.

(56) References Cited

U.S. PATENT DOCUMENTS

| 11,082,195 | B2 * | 8/2021 | Yang | ...................... H04L 5/001 |
| 2014/0050176 | A1 * | 2/2014 | Lin | ...................... H04L 1/1861 370/329 |

(Continued)

FOREIGN PATENT DOCUMENTS

EP 2938018 B1 10/2017

OTHER PUBLICATIONS

"3rd Generation Partnership Project; Technical Specification Group Radio Access Network; Evolved Universal Terrestrial Radio Access (E-UTRA); Physical channels and modulation(Release 13)", 3GPP TS 36.211 V13.1.0 (Mar. 2016).

(Continued)

*Primary Examiner* — Michael J Moore, Jr.
(74) *Attorney, Agent, or Firm* — ScienBiziP, P.C.

(57) ABSTRACT

A terminal apparatus receives a transport block in a primary cell, selects a first transmission method in a case that a scheduling request is a negative scheduling request, HARQ-ACK is transmitted in a subframe n, and a subframe q in a secondary cell does not correspond to any of first prescribed subframes, selects a second transmission method in a case that the subframe q corresponds to one of the first prescribed subframes, and transmits the HARQ-ACK in a PUCCH resource for the HARQ-ACK, wherein the subframe q is given by n−4 in a case that a first higher layer parameter for (Continued)

the secondary cell is not configured, and the subframe q is given by n−3 in a case that the first higher layer parameter for the secondary cell is configured for the terminal apparatus 1.

6 Claims, 18 Drawing Sheets

(56) References Cited

U.S. PATENT DOCUMENTS

| | | | |
|---|---|---|---|
| 2015/0124670 A1 | 5/2015 | Park | |
| 2015/0200752 A1 | 7/2015 | Yin et al. | |
| 2017/0237546 A1 | 8/2017 | Yang et al. | |
| 2018/0042015 A1* | 2/2018 | Yin | H04L 1/1861 |
| 2018/0054280 A1* | 2/2018 | Fu | H04W 72/0446 |
| 2019/0150148 A1* | 5/2019 | Ouchi | H04W 72/0446 |
| | | | 370/336 |
| 2019/0289586 A1* | 9/2019 | Ouchi | H04L 27/2602 |
| 2020/0154411 A1* | 5/2020 | Liu | H04L 1/1864 |
| 2020/0154496 A1* | 5/2020 | Yi | H04W 72/04 |
| 2020/0358559 A1* | 11/2020 | Liu | H04L 5/0055 |
| 2021/0021454 A1* | 1/2021 | Horiuchi | H04W 52/346 |

OTHER PUBLICATIONS

"3rd Generation Partnership Project; Technical Specification Group Radio Access Network; Evolved Universal Terrestrial Radio Access (E-UTRA); Multiplexing and channel coding(Release 13)", 3GPP TS 36.212 V13.1.0 (Mar. 2016).

"3rd Generation Partnership Project; Technical Specification Group Radio Access Network; Evolved Universal Terrestrial Radio Access (E-UTRA); Physical layer procedures(Release 13)", 3GPP TS 36.213 V13.1.1 (Mar. 2016).

"3rd Generation Partnership Project; Technical Specification Group Radio Access Network; Evolved Universal Terrestrial Radio Access (EUTRA); and Evolved Universal Terrestrial Radio Access Network (E-UTRAN); Overall description; Stage 2(Release 13)", 3GPP TS 36.300 V13.2.0 (Dec. 2015).

Ericsson, "New Work Item on shortened TTI and processing time for LTE", RP-161299, 3GPP TSG RAN Meeting #72 Busan, Korea, Jun. 13-16, 2016.

Sharp, "Corrections on short processing time for 1ms TTI", R1-1804871, 3GPP TSG RAN WG1 Meeting #92bis Sanya, China, Apr. 16-Apr. 20, 2018.

Samsung, "Summary of [90b-LTE-14] Email approval on remaining issues for 1 ms + FS2 (sTTI and 1 ms) + FS3", R1-1721067, 3GPP TSG RAN WG1 Meeting 91, Reno, USA, Nov. 27-Dec. 1, 2017.

Nokia et al., "On configuration of shortened processing time for 1ms TTI", R1-1717181, 3GPP TSG-RAN WG1 Meeting #90bis, Prague, Czech Republic, Oct. 9-13, 2017.

* cited by examiner

| HARQ-ACK(0) | HARQ-ACK(1) | HARQ-ACK(2) | HARQ-ACK(3) |
|---|---|---|---|
| TRANSPORT BLOCK 621 | TRANSPORT BLOCK 622 | TRANSPORT BLOCK 631 | TRANSPORT BLOCK 632 |

1> (Case AAA) If the UE is not configured with higher layer
   parameter *shortProcessingTime* for secondary cell,
   2> q=n-4

1> (Case BBB) If the UE is configured with higher layer parameter
   shortProcessingTime for secondary cell,
   2> q=n-3

1> For HARQ-ACK transmission in subframe n with PUCCH
format 1b with channel selection, if subframe q in the
secondary cell is not any of the first prescribed subframes,
2> the terminal device performes the first transmission method
described in S602.

1> For HARQ-ACK transmission in subframe n with PUCCH
format 1b with channel selection, if subframe q in the
secondary cell is either one of the first prescribed subframes,
2> the terminal device performes the second transmission
method described in S603 .

FIG. 8

| HARQ-ACK(0) | HARQ-ACK(1) | HARQ-ACK(2) | HARQ-ACK(3) | $n^{(1)}_{PUCCH}$ | b(0), b(1) |
|---|---|---|---|---|---|
| ACK | ACK | ACK | ACK | $n^{(1)}_{PUCCH,1}$ | 1, 1 |
| ACK | NACK or DTX | ACK | ACK | $n^{(1)}_{PUCCH,2}$ | 0, 1 |
| NACK or DTX | ACK | ACK | ACK | $n^{(1)}_{PUCCH,1}$ | 0, 1 |
| NACK or DTX | NACK or DTX | ACK | ACK | $n^{(1)}_{PUCCH,3}$ | 0, 1 |
| ACK | ACK | ACK | NACK or DTX | $n^{(1)}_{PUCCH,1}$ | 1, 0 |
| ... | ... | ... | ... | | |
| NACK | NACK or DTX | NACK or DTX | NACK or DTX | $n^{(1)}_{PUCCH,0}$ | 0, 0 |
| DTX | DTX | NACK or DTX | NACK or DTX | No Transmission | |

1> (Case CCC) If the UE is not configured with higher layer parameter *shortProcessingTime* for primary cell and not configured with higher layer parameter *shortProcessingTime* for secondary cell, .
  2> then j=i.

1> (Case DDD) If the UE is configured with higher layer parameter shortProcessingTime for primary cell and not configured with higher layer parameter *shortProcessingTime* for secondary cell and the PDCCH is in the common search space, ,
  2> then j=i.

1> (Case EEE) If the UE is configured with higher layer parameter *shortProcessingTime* for primary cell and not configured with higher layer parameter *shortProcessingTime* for secondary cell and the PDCCH is in the UE-specific search space,
  2> then j=i-1..

1> (Case FFF) If the UE is configured with higher layer parameter *shortProcessingTime* for primary cell and also configured with higher layer parameter *shortProcessingTime* for secondary cell and the PDCCH is in the common search space,
  2> then j=i+1.

1> (Case GGG) If the UE is configured with higher layer parameter *shortProcessingTime* for primary cell and also configured with higher layer parameter *shortProcessingTime* for secondary cell and the PDCCH is in the UE-specific search space,
  2> then j=i.

In Case DDD to GGG, the PDCCH is used for scheduling the TB on the primary cell.

1> if one transport block or two transport blocks is detected on the primary cell in subframe i, and if subframe j in the secondary cell is not any of the first prescribed subframes,
2> the terminal device performes the third transmission method described in S1102.

1> if one transport block or two transport blocks is detected on the primary cell in subframe i, and if subframe j in the secondary cell is either one of the first prescribed subframes,
2> the terminal device performes the forth transmission method described in S1103.

FIG. 14

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-238476 filed on Dec. 13, 2017, the contents of which are incorporated herein by reference.

BACKGROUND ART

A radio access scheme and a radio network for cellular mobile communication (hereinafter, referred to as "Long Term Evolution (LTE)," or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by base station apparatuses. A single base station apparatus may manage multiple cells.

In LTE release 13, it is specified that a PUSCH and a PUCCH transmit uplink control information (NPL 1, 2, 3, and 4). In 3GPP, latency reduction enhancements have been studied. In NPL 5, a discussion has been started for shortening processing time for 1 ms Transmission Time Interval (TTI).

CITATION LIST

Non Patent Literature

NPL 1: "3GPP TS 36.211 V13.1.0 (2016-03)", 29 Mar. 2016.
NPL 2: "3GPP TS 36.212 V13.1.0 (2016-03)", 29 Mar. 2016.
NPL 3: "3GPP TS 36.213 V13.1.1 (2016-03)", 31 Mar. 2016.
NPL 4: "3GPP TS 36.300 V13.2.0 (2015-12)", 13 Jan. 2015.
NPL 5: "Work Item on shortened TTI and processing time for LTE", RP-161299, Ericsson, 3GPP TSG RAN Meeting #72, Busan, Korea, Jun. 13-16, 2016.

SUMMARY OF INVENTION

Technical Problem

An aspect of the present invention provides a terminal apparatus capable of transmitting uplink control information efficiently, a communication method used for the terminal apparatus, a base station apparatus capable of receiving uplink control information efficiently, and a communication method used for the base station apparatus.

Solution to Problem (1) According to some aspects of the present invention, the following measures are provided. Specifically, a first aspect of the present invention is a terminal apparatus for communicating with a base station apparatus by using at least two serving cells including one primary cell of FDD and one secondary cell of TDD, the terminal apparatus including: a receiver configured to receive a transport block; and a transmitter configured to select a first transmission method in a case that a scheduling request is a negative scheduling request, HARQ-ACK for the transport block is transmitted in a subframe n, and a subframe q in the secondary cell does not correspond to any of first prescribed subframes, select a second transmission method in a case that the scheduling request is a negative scheduling request, the HARQ-ACK for the transport block is transmitted in the subframe n, and the subframe q in the secondary cell corresponds to one of the first prescribed subframes, and transmit the HARQ-ACK in a PUCCH resource for the HARQ-ACK by using a transmission method selected, wherein the first transmission method is a method for transmitting HARQ-ACK with PUCCH format 1b with channel selection for FDD, the second transmission method is a method for transmitting HARQ-ACK with PUCCH format 1a or 1b for FDD, the subframe q is a subframe n−4 in a case that a higher layer parameter shortProcessingTime for the secondary cell is not configured, and the subframe q is a subframe n−3 in a case that the higher layer parameter shortProcessingTime for the secondary cell is configured.

(2) A second aspect of the present invention is a base station apparatus for communicating with a terminal apparatus by using at least two serving cells including one primary cell of FDD and one secondary cell of TDD, the base station apparatus including: a transmitter configured to transmit a transport block; and a receiver configured to select a first transmission method in a case that a scheduling request is a negative scheduling request, HARQ-ACK for the transport block is transmitted in a subframe n, and a subframe q in the secondary cell does not correspond to any of first prescribed subframes, select a second transmission method in a case that the scheduling request is a negative scheduling request, the HARQ-ACK for the transport block is transmitted in the subframe n, and the subframe q in the secondary cell corresponds to one of the first prescribed subframes, and receive the HARQ-ACK in a PUCCH resource for the HARQ-ACK, based on a transmission method selected, wherein the first transmission method is a method for transmitting HARQ-ACK with PUCCH format 1b with channel selection for FDD, the second transmission method is a method for transmitting HARQ-ACK with PUCCH format 1a or 1b for FDD, the subframe q is a subframe n−4 in a case that a higher layer parameter shortProcessingTime for the secondary cell is not configured, and the subframe q is a subframe n−3 in a case that the higher layer parameter shortProcessingTime for the secondary cell is configured.

(3) A third aspect of the present invention is a communication method for a terminal apparatus for communicating with a base station apparatus by using at least two serving cells including one primary cell of FDD and one secondary cell of TDD, the communication method including the steps of: receiving a transport block; selecting a first transmission method in a case that a scheduling request is a negative scheduling request, HARQ-ACK for the transport block is transmitted in a subframe n, and a subframe q in the secondary cell does not correspond to any of first prescribed subframes; selecting a second transmission method in a case that the scheduling request is a negative scheduling request, the HARQ-ACK for the transport block is transmitted in the subframe n, and the subframe q in the secondary cell corresponds to one of the first prescribed subframes; and transmitting the HARQ-ACK in a PUCCH resource for the HARQ-ACK by using a transmission method selected, wherein the first transmission method is a method for transmitting HARQ-ACK with PUCCH format 1b with channel selection for FDD, the second transmission method is a method for transmitting HARQ-ACK with PUCCH format 1a or 1b for FDD, the subframe q is a subframe n−4 in a case that a higher layer parameter shortProcessingTime for the secondary cell is not configured, and the subframe q is a subframe n−3 in a case that the higher layer parameter shortProcessingTime for the secondary cell is configured.

(4) A fourth aspect of the present invention is a communication method for a base station apparatus for communicating with a terminal apparatus by using at least two serving cells including one primary cell of FDD and one secondary cell of TDD, the communication method including the steps of: transmitting a transport block; selecting a first transmission method in a case that a scheduling request is a negative scheduling request, HARQ-ACK for the transport block is transmitted in a subframe n, and a subframe q in the secondary cell does not correspond to any of first prescribed subframes; selecting a second transmission method in a case that the scheduling request is a negative scheduling request, the HARQ-ACK for the transport block is transmitted in the subframe n, and the subframe q in the secondary cell corresponds to one of the first prescribed subframes; and receiving the HARQ-ACK in a PUCCH resource for the HARQ-ACK, based on a transmission method selected, wherein the first transmission method is a method for transmitting HARQ-ACK with PUCCH format 1b with channel selection for FDD, the second transmission method is a method for transmitting HARQ-ACK with PUCCH format 1a or 1b for FDD, the subframe q is a subframe n−4 in a case that a higher layer parameter shortProcessingTime for the secondary cell is not configured, and the subframe q is a subframe n−3 in a case that the higher layer parameter shortProcessingTime for the secondary cell is configured.

Advantageous Effects of Invention

According to an aspect of the present invention, the terminal apparatus can transmit uplink control information efficiently. The base station apparatus can receive uplink control information efficiently.

BRIEF DESCRIPTION OF DRAWINGS

FIG. 5 is a diagram illustrating an example of mapping of HARQ-ACK (j) and a transport block according to the present embodiment.

FIG. 7 is a diagram illustrating an example of a relationship between a subframe q and a subframe n in S600 of FIG. 6 according to the present embodiment.

FIG. 8 is a diagram illustrating an example of selecting an HARQ-ACK transmission method in S601 of FIG. 6 according to the present embodiment.

FIG. 9 is a diagram illustrating an example of mapping between HARQ-ACK (j) and PUCCH resource $n^{(1)}_{sPUCCH}$ and b (0) b (1) for the first transmission method according to the present embodiment.

FIG. 12 is a diagram illustrating an example of a relationship between a subframe i and a subframe j in S100 of FIG. 11 according to the present embodiment.

FIG. 14 is a diagram illustrating an example of selecting an HARQ-ACK transmission method in S1101 of FIG. 11 according to present embodiment.

DESCRIPTION OF EMBODIMENTS

Embodiments of the present invention will be described below.

Figure 1:
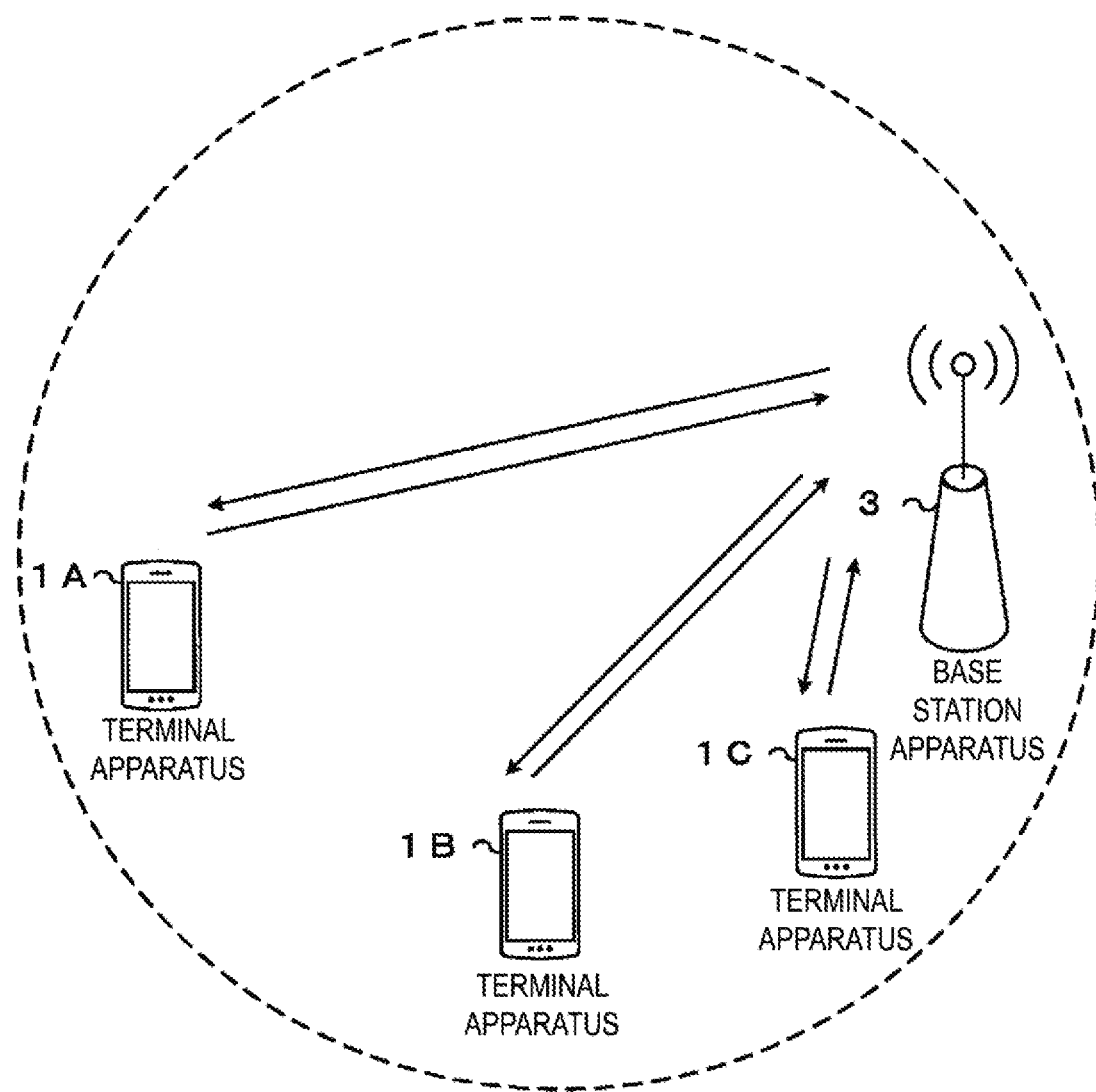
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are referred to as terminal apparatuses 1.

Hereinafter, carrier aggregation will be described.

According to the present embodiment, two serving cells are configured for a terminal apparatus 1. A technology in which the terminal apparatus 1 communicates via the multiple serving cells is referred to as cell aggregation or carrier aggregation. The two serving cells include one primary cell. The two serving cells include one secondary cell. The primary cell is a serving cell in which an initial connection establishment procedure has been performed, a serving cell in which a connection re-establishment procedure has been initiated, or a cell indicated as a primary cell in a handover procedure. The secondary cell may be configured at a point of time when or after a Radio Resource Control (RRC) connection is established. In the present embodiment, Frequency Division Duplex (FDD) may be applied to the primary cell. Time Division Duplex (TDD) may be applied to the secondary cell.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as component carriers.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

Physical channels and physical signals according to the present embodiment will be described.

In FIG. 1, the following uplink physical channels are used for uplink radio communication from the terminal apparatus 1 to the base station apparatus 3. The uplink physical channels are used for transmitting information output from higher layers.

Physical Uplink Control Channel (PUCCH)
Physical Uplink Shared Channel (PUSCH)

The PUCCH is used to transmit Uplink Control Information (UCI). One PUCCH is transmitted in one subframe. According to the present embodiment, the terminal apparatus 1 may transmit the PUCCH only in the primary cell.

The uplink control information includes downlink Channel State Information (CSI), a Scheduling Request (SR) for indicating a request for a PUSCH resource, and a Hybrid Automatic Repeat request ACKnowledgement (HARQ-ACK) for downlink data (Transport block, Medium Access Control Protocol Data Unit (MAC PDU), Downlink-Shared Channel (DL-SCH), or Physical Downlink Shared Channel (PDSCH)). The HARQ-ACK indicates acknowledgement (ACK) or negative-acknowledgement (NACK).

The HARQ-ACK is also referred to as ACK/NACK, HARQ feedback, HARQ-ACK feedback, HARQ response, HARQ-ACK response, HARQ information, HARQ-ACK information, HARQ control information, and HARQ-ACK control information. In a case that downlink data is successfully decoded, ACK for the downlink data is generated. In a case that the downlink data is not successfully decoded, NACK for the downlink data is generated. Discontinuous transmission (DTX) may mean that the downlink data has not been detected. Discontinuous transmission (DTX) may mean that data for which HARQ-ACK response is to be transmitted has not been detected.

The scheduling request includes a positive scheduling request or a negative scheduling request. The positive scheduling request indicates that a UL-SCH resource for initial transmission is requested. The negative scheduling request indicates that a UL-SCH resource for initial transmission is not requested. The terminal apparatus 1 may determine whether or not to transmit a positive scheduling request. The scheduling request being a negative scheduling request may mean that the terminal apparatus 1 determines not to transmit a positive scheduling request.

PUCCH format 1 is used to transmit a positive scheduling request. PUCCH format 1 is not used to transmit a negative scheduling request. PUCCH format 1a is used to transmit 1 bit of HARQ-ACK. PUCCH format 1b is used to transmit 2 bits of HARQ-ACK. PUCCH format 1b with channel selection is used to transmit up to 4 bits of HARQ-ACK in a case that more than one serving cells are configured for the terminal apparatus. The channel selection can change its interpretation even with the same bit value, by selecting any one of multiple PUCCH resources. For example, a first PUCCH resource and a second PUCCH resource may share the same bit value, but the contents may be different. The channel selection can extend HARQ-ACK by using multiple PUCCH resources. In the present embodiment, the terminal apparatus 1 for which two serving cells are configured transmits only HARQ-ACK by using PUCCH format 1b with channel selection.

The PUSCH may be used to transmit uplink data (Transport block, Medium Access Control Protocol Data Unit (MAC PDU), Uplink-Shared Channel (UL-SCH)). The PUSCH may be used to transmit HARQ-ACK and/or channel state information together with uplink data. The PUSCH may be used to transmit only channel state information or to transmit only HARQ-ACK and channel state information.

In FIG. 1, the following downlink physical channels are used for downlink radio communication from the base station apparatus 3 to the terminal apparatus 1. The downlink physical channels are used for transmitting information output from higher layers.

Physical Control Format Indicator Channel (PCFICH)
Physical Downlink Control Channel (PDCCH)
Enhanced Physical Downlink Control Channel (EPDCCH)
Physical Downlink Shared Channel (PDSCH)

The PCFICH is used to transmit a Control Format Indicator (CFI). The CFI is information related to a region (OFDM symbol) used for transmission of the PDCCH and/or a region (OFDM symbol) used for transmission of the PDSCH.

The PDCCH and the EPDCCH are used to transmit Downlink Control Information (DCI). The downlink control information is also referred to as a DCI format. The downlink control information includes downlink grant and uplink grant. The downlink grant is also referred to as downlink assignment or downlink allocation.

Cyclic Redundancy Check (CRC) parity bits added to downlink control information transmitted on one PDCCH are scrambled with a Cell-Radio Network Temporary Identifier (C-RNTI), a Semi Persistent Scheduling (SPS) C-RNTI, or a Temporary C-RNTI. The C-RNTI and the SPS C-RNTI are identifiers for identifying a terminal apparatus within a cell. The Temporary C-RNTI is an identifier for identifying the terminal apparatus 1 that has transmitted a random access preamble in a contention based random access procedure.

The C-RNTI and the Temporary C-RNTI are used to identify PDSCH transmission or PUSCH transmission in a single subframe. The SPS C-RNTI is used to periodically allocate a resource of the PDSCH or the PUSCH.

Hereinafter, unless indicated to the contrary, CRC parity bits added to the downlink control information in the present embodiment are scrambled with the C-RNTI.

The PDCCH is transmitted in a PDCCH candidate. The terminal apparatus 1 monitors a set of PDCCH candidates in a serving cell. A set of PDCCH candidates is referred to as a search space. The search space includes at least a Common Search Space (CSS) and a UE-specific Search Space (USS). The UE-specific search space is derived from at least a value of the C-RNTI set for the terminal apparatus 1. In other words, the UE-specific search space is derived separately for each terminal apparatus 1. The common search space is a search space common between multiple terminal apparatuses 1, and includes a Control Channel Element (CCE) of a predetermined index. The CCE includes multiple resource elements. The monitoring means to attempt to decode the PDCCH in accordance with a DCI format. The common search space is included in the primary cell. The common search space is not included in the secondary cell. The terminal apparatus 1 may monitor the common search space only in the primary cell.

One downlink grant may be used for scheduling of one PDSCH in one cell. The downlink grant may be used for scheduling of the PDSCH within the same subframe as the subframe on which the downlink grant is transmitted.

One uplink grant may be used for scheduling of one PUSCH in one cell. The uplink grant may be used for scheduling of one PUSCH within the fourth or later subframe from the subframe on which the uplink grant is transmitted.

The PDSCH is used to transmit downlink data (Downlink Shared Channel (DL-SCH)).

The UL-SCH and the DL-SCH are transport channels. A channel used in the Medium Access Control (MAC) layer is referred to as a transport channel. A unit of a transport channel used in the MAC layer is also referred to as a transport block (TB) or a MAC Protocol Data Unit (PDU). Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process and a coding process is performed for each codeword. One codeword is mapped to one or multiple layers.

Figure 2:
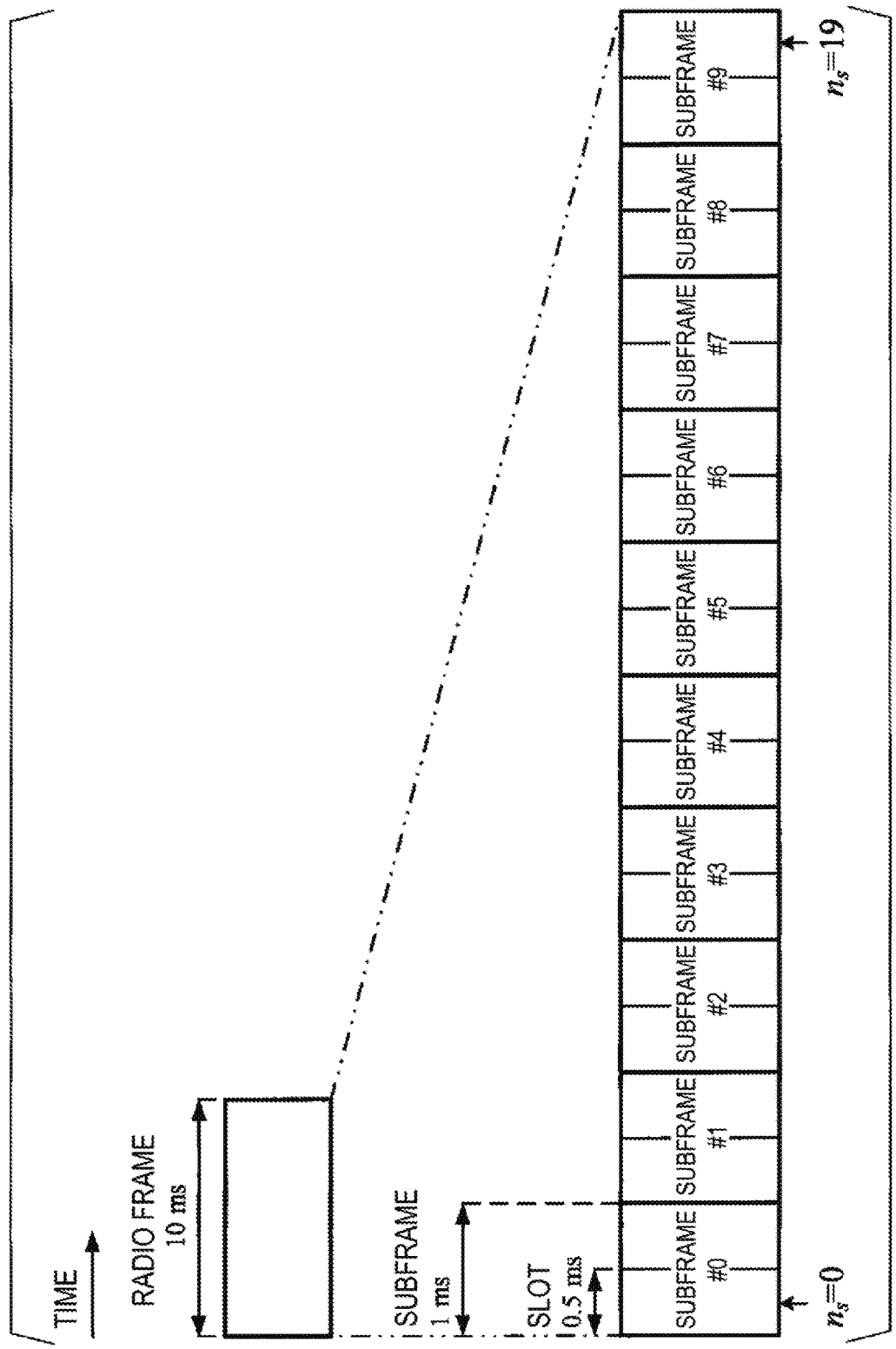
FIG. 2 is a diagram illustrating a schematic configuration of a radio frame according to the present embodiment.

An example of a configuration of a radio frame according to the present embodiment will be described below. FIG. 2 is a diagram illustrating a schematic configuration of a radio frame according to the present embodiment. Each of radio frames is 10 ms in length. In FIG. 2, the horizontal axis is the time axis. Each of the radio frames includes 10 subframes. Each of the subframes is 1 ms in length and is defined by two continuous slots. Each of the slots is 0.5 ms in length. To be more precise, 10 subframes can be used at each interval of 10 ms. A subframe is also referred to as a Transmission Time Interval (TTI).

Figure 3:
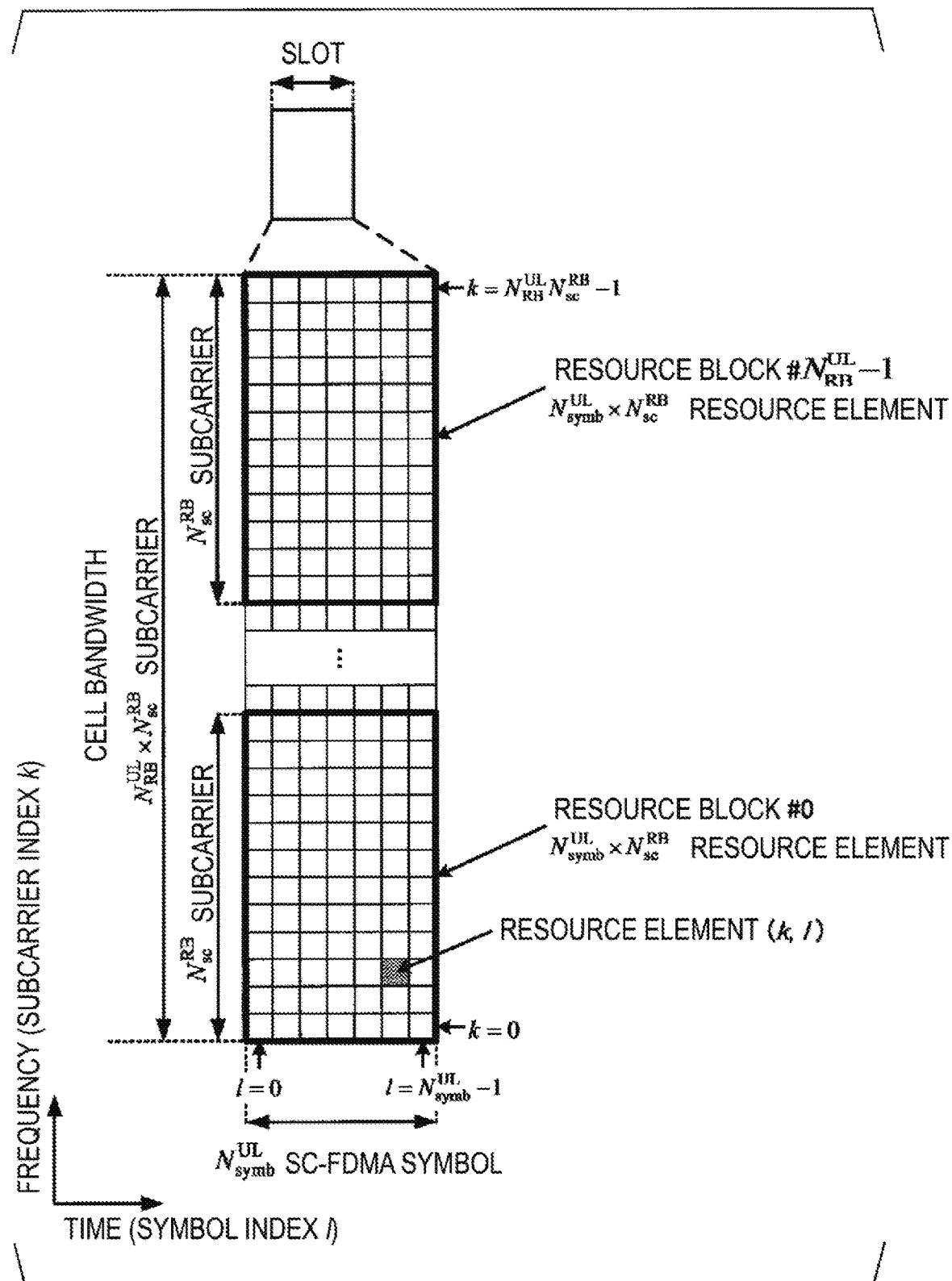
FIG. 3 is a diagram illustrating a schematic configuration of an uplink slot according to the present embodiment.

An example of a configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is the time axis, and the vertical axis is the frequency axis. In FIG. 3, l is an SC-FDMA symbol number/index, and k is a subcarrier number/index.

A physical signal or a physical channel transmitted in each of the slot is expressed by a resource grid. In uplink, the resource grid is defined by multiple subcarriers and multiple SC-FDMA symbols. Each element within the resource grid is referred to as a resource element. The resource element is expressed by a subcarrier number/index k and an SC-FDMA symbol number/index l.

The uplink slot includes multiple SC-FDMA symbols l (l=0, 1, . . . , $N^{UL}_{symb}$) in the time domain. $N^{UL}_{symb}$ indicates the number of SC-FDMA symbols included in one uplink slot. For normal Cyclic Prefix (CP) in the uplink, $N^{UL}_{symb}$ is 7. For extended CP in the uplink, $N^{UL}_{symb}$ is 6. In the present embodiment, the CP length is normal CP for the uplink and the downlink.

The uplink slot includes multiple subcarrier k (k=0, 1, . . . , $N^{UL}_{RB}*N^{RB}_{sc}$) in the frequency domain. $N^{UL}_{RB}$ is the uplink bandwidth configuration for the serving cell expressed by a multiple of $N^{RB}_{sc}$. $N^{RB}_{sc}$ is the (physical) resource block size in the frequency domain expressed by the number of subcarriers. The subcarrier spacing $\Delta f$ may be 15 kHz, and $N^{RB}_{sc}$ may be 12. That is, $N^{RB}_{sc}$ may be 180 kHz. The subcarrier spacing $\Delta f$ may vary for each channel and/or for each TTI/sTTI.

A resource block is used to express mapping of a physical channel to resource elements. As a resource block, a virtual resource block and a physical resource block are defined. A physical channel is first mapped to a virtual resource block. Thereafter, the virtual resource block is mapped to a physical resource block. One physical resource block is defined by $N^{UL}_{symb}$ continuous SC-FDMA symbols in the time domain and $N^{RB}_{sc}$ continuous subcarriers in the frequency domain. Hence, one physical resource block is constituted by ($N^{UL}_{symb}*N^{RB}_{sc}$) resource elements. One physical resource block corresponds to one slot in the time domain. Physical resource blocks are numbered (0, 1, . . . , $N^{UL}_{RB}-1$) in ascending order of frequencies in the frequency domain.

A downlink slot according to the present embodiment includes multiple OFDM symbols. The configuration of the downlink slot according to the present embodiment is basically the same as that of the uplink slot except that the resource grid is defined by multiple subcarriers and multiple OFDM symbols, so the description of the configuration of the downlink slot will be omitted.

In the present embodiment, the primary cell and the secondary cell are included in a primary PUCCH group. In other words, in the present embodiment, HARQ-ACK for a transport block received in the secondary cell is transmitted in the primary cell.

The following describes the transmission timing of HARQ-ACK according to the present embodiment.

In the present embodiment, in a case that the terminal apparatus 1 detects the PDSCH in a subframe $n-k_p$, the terminal apparatus 1 transmits HARQ-ACK for the PDSCH in a subframe n. In other words, the transmission timing of the HARQ-ACK for the PDSCH is a subframe after $k_p$ from the subframe in which the PDSCH is transmitted. In other words, in a case that the terminal apparatus 1 detects the PDSCH in a subframe n, the terminal apparatus 1 transmits HARQ-ACK for the PDSCH in the subframe $n+k_p$. Note that the value of $k_p$ may be configured for each serving cell. $K_p$ for a serving cell c is also referred to as $k_{pc}$. $K_p$ for the primary cell is also referred to as $k_{pp}$. $K_p$ for the secondary cell is also referred to as $k_{ps}$. In a case that the terminal apparatus 1 detects the PDSCH in a subframe $n-k_{pp}$ in the primary cell, the terminal apparatus 1 transmits HARQ-ACK for the PDSCH in a subframe n. In a case that the terminal apparatus 1 detects the PDSCH in a subframe $n-k_{ps}$ in the secondary cell, the terminal apparatus 1 transmits HARQ-ACK for the PDSCH in a subframe n.

In the present embodiment, the transmission timing of the HARQ-ACK for the PDSCH in the primary cell cell may be given based on at least whether or not a higher layer parameter shortProcessingTime is configured for the primary cell, and/or whether the PDCCH used to schedule the PDSCH in the primary cell is transmitted in any search space.

In other words, in a case that the higher layer parameter (RRC layer parameter) shortProcessingTime for the primary cell is not configured for the terminal apparatus 1, $k_p$ for the primary cell ($k_{pp}$) may be 4. In a case that the higher layer parameter shortProcessingTime for the primary cell is configured for the terminal apparatus 1, and in a case that the PDCCH used to schedule the PDSCH in the subframe n in the primary cell is mapped (transmitted) to a common search space in the primary cell, $k_p$ for the primary cell ($k_{pp}$) may be 4. In a case that the higher layer parameter shortProcessingTime for the primary cell is configured for the terminal apparatus 1, and in a case that the PDCCH used to schedule the PDSCH in the subframe n in the primary cell is mapped to a UE-specific search space in the primary cell, $k_p$ for the primary cell ($k_{pp}$) may be 3.

In the present embodiment, the transmission timing of the HARQ-ACK for the PDSCH in the secondary cell to which TDD is applied may be given based on at least whether the higher layer parameter shortProcessingTime is configured in the secondary cell.

In other words, in a case that the higher layer parameter (RRC layer parameter) shortProcessingTime for the secondary cell is not configured for the terminal apparatus 1, $k_p$ for the secondary cell ($k_{ps}$) may be 4. In a case that the higher layer parameter shortProcessingTime for the secondary cell is configured for the terminal apparatus 1, $k_p$ for the secondary cell ($k_{ps}$) may be 4.

In the present embodiment, the terminal apparatus 1 in which the higher layer parameter shortProcessingTime for a certain serving cell is configured may not monitor the EPDCCH in the serving cell.

Figure 4:
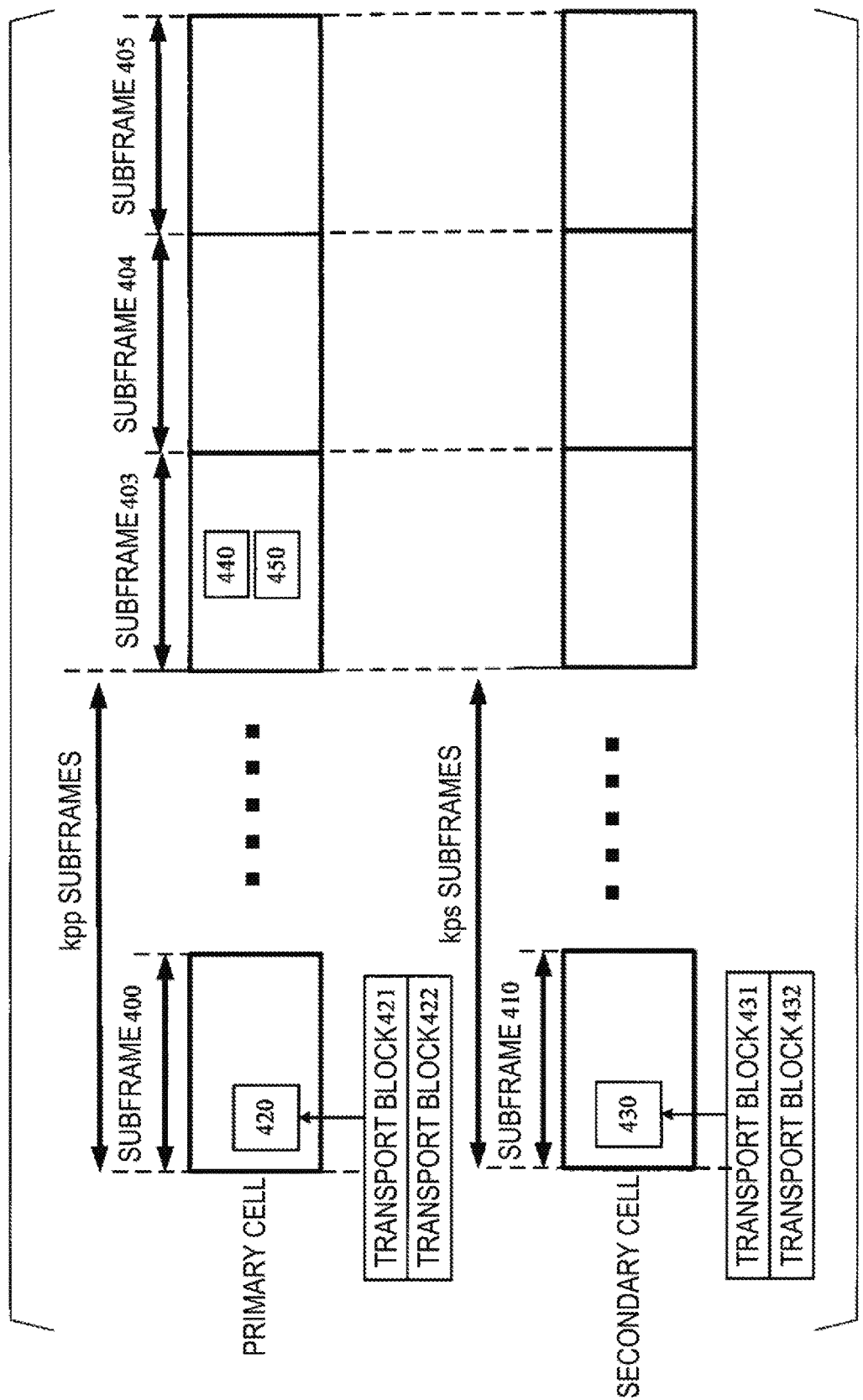
FIG. 4 is a diagram illustrating an example of transmission timing of HARQ-ACK according to the present embodiment.

FIG. 4 is a diagram illustrating an example of transmission timing of HARQ-ACK according to the present embodiment. The base station apparatus 3 may transmit a PDSCH 420 in the primary cell in a subframe 400. The base station apparatus 3 may transmit a PDSCH 430 in the secondary cell in a subframe 410. The PDSCH 420 includes two transport blocks 421 and 422. The PDSCH 430 includes two transport blocks 431 and 432.

The terminal apparatus 1 transmits HARQ-ACK for the PDSCH 420 and/or the PDSCH 430 by using a PUCCH resource 440 or a PUCCH resource 450 in a subframe 403 in the primary cell. In other words, the terminal apparatus 1 transmits HARQ-ACK for the transport blocks 421, 422, 431, and 432 by using the PUCCH resource 440 or the PUCCH resource 450 in the subframe 403 in the primary cell. Here, the subframe 400 is a subframe $k_{pp}$ prior to the subframe 403 in which the HARQ-ACK transmission is performed. The subframe 410 is a subframe $k_{ps}$ prior to the subframe 403 in which the HARQ-ACK transmission is performed. The value of $k_{pp}$ and the value of $k_{ps}$ may be determined based on the methods described above. In a case that the value of $k_{pp}$ corresponding to the primary cell and the value of $k_{ps}$ corresponding to the secondary cell are the same, the subframe 410 in the secondary cell is the subframe 400 in the secondary cell.

In the subframe 403, the PUCCH resource 440 may include four PUCCH resources for HARQ-ACK $\{n^{(1)}_{PUCCH,0}, n^{(1)}_{PUCCH,1}, n^{(1)}_{PUCCH,2}, n^{(1)}_{PUCCH,3}\}$. The PUCCH resource 450 is one PUCCH resource $\{n^{(1)}_{PUCCH,SRI}\}$ for the scheduling request. The PUCCH resources for HARQ-ACK are also referred to as HARQ-ACK PUCCH resources. The PUCCH resource for scheduling request is also referred to as an SR PUCCH resource.

The base station apparatus 3 may transmit, to the terminal apparatus 1, information including an RRC layer parameter for determining the HARQ-ACK PUCCH resources 440 $\{n^{(1)}_{PUCCH,0}, n^{(1)}_{PUCCH,1}, n^{(1)}_{PUCCH,2}, n^{(1)}_{PUCCH,3}\}$. The base station apparatus 3 may transmit, to the terminal apparatus 1, information including an RRC layer parameter for indicating the SR PUCCH resource 450 $\{n^{(1)}_{PUCCH,SRI}\}$.

In the present embodiment, in a case that both the HARQ-ACK and the scheduling request are transmitted in the same subframe, the terminal apparatus 1 transmits the HARQ-ACK on the HARQ-ACK PUCCH resource 440 for a negative scheduling request. In a case that both the HARQ-ACK and the scheduling request are transmitted in the same subframe, and the scheduling request is a negative scheduling request, the terminal apparatus 1 transmits the HARQ-ACK on the allocated HARQ-ACK PUCCH resource 440.

In the present embodiment, in a case that both the HARQ-ACK and the scheduling request are transmitted in the same subframe, the terminal apparatus 1 may transmit the HARQ-ACK on the SR PUCCH resource 450 for a positive scheduling request. In a case that both the HARQ-ACK and the scheduling request are transmitted in the same subframe, and the scheduling request is a positive scheduling request, the terminal apparatus 1 transmits the HARQ-ACK on the allocated SR PUCCH resource 450.

FIG. 5 is a diagram illustrating an example of mapping of HARQ-ACK (j) and a transport block according to the present embodiment. In FIG. 5, HARQ-ACK (0) corresponds to the transport block 421, HARQ-ACK (1) corresponds to the transport block 422, HARQ-ACK (2) corresponds to the transport block 431, and HARQ-ACK (3) corresponds to the transport block 432.

Hereinafter, in the present embodiment, a method for determining a transmission method of HARQ-ACK in a case that the scheduling request is a negative scheduling request, and HARQ-ACK for the transport block detected in the subframe $n-k_{pp}$ in the primary cell is transmitted in the subframe n in the primary cell will be described.

Figure 6:
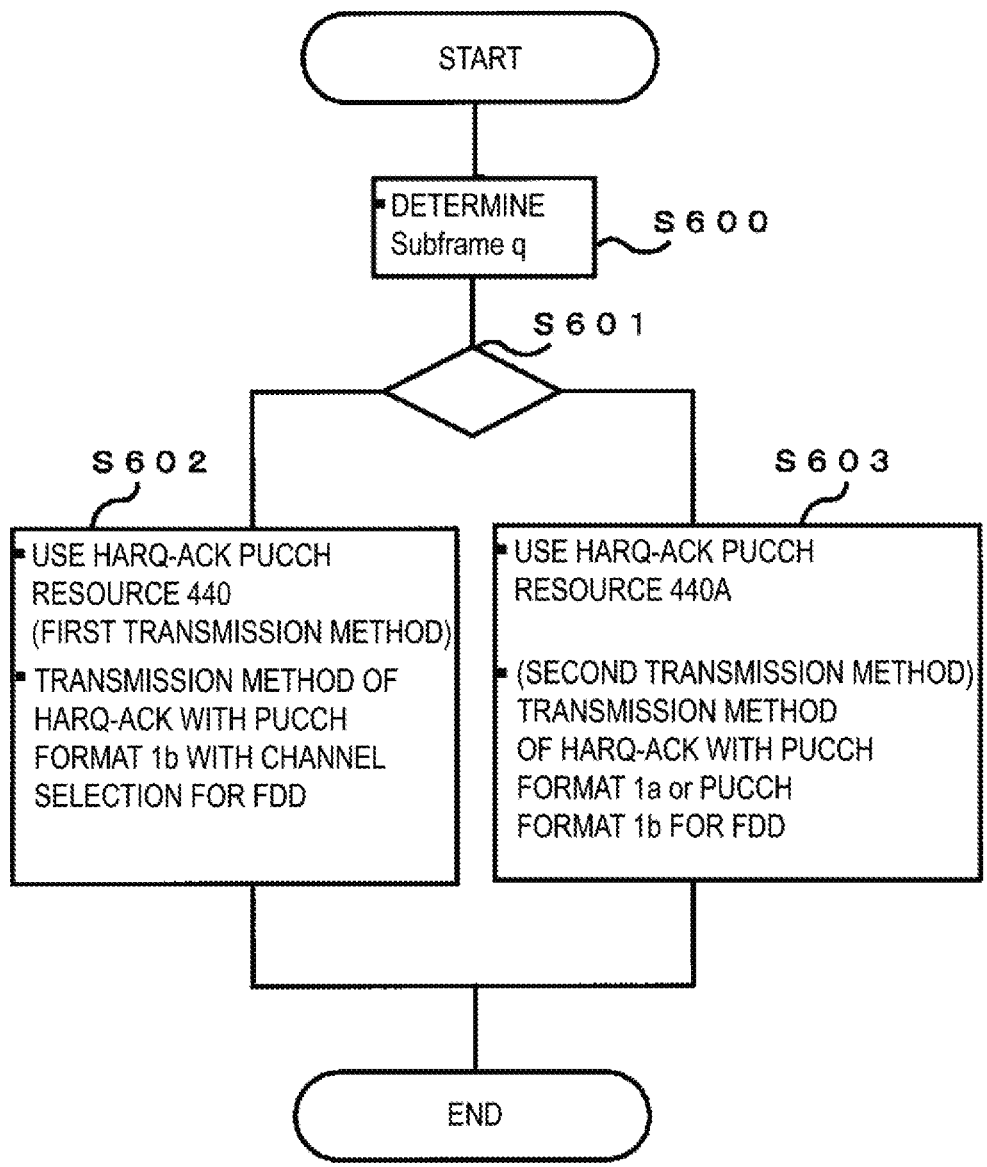
FIG. 6 is a flowchart for selecting a transmission method of HARQ-ACK in the subframe 403 in a case that a scheduling request according to the present embodiment is a negative scheduling request.

FIG. 6 is a flowchart for selecting a transmission method of HARQ-ACK in the subframe 403 in a case that the scheduling request according to the present embodiment is a negative scheduling request.

In FIG. 6, the subframe 403 may be referred to as the subframe n. The PDSCH 420 may be received in the subframe $n-k_{pp}$ in the primary cell. The PDSCH 430 may be received in the subframe q in the secondary cell. In other words, the PDSCH 430 may be received in the subframe $n-k_{ps}$ in the secondary cell. In FIG. 6, in a case that the scheduling request is a negative scheduling request, the terminal apparatus 1 transmits HARQ-ACK by using the HARQ-ACK PUCCH resource 440 allocated in the subframe n in the primary cell. In other words, FIG. 6 is a diagram illustrating a method for determining a transmission method of HARQ-ACK in a case that the scheduling request is a negative scheduling, and HARQ-ACK for the transport block detected in the subframe $n-k_{pp}$ in the primary cell is transmitted in the subframe n. In the present embodiment, the subframe q may be replaced with any one of the subframe n−4 and the subframe n−3.

(S600) The terminal apparatus 1 determines the subframe q. The terminal apparatus 1 may determine the relationship between the subframe q and the subframe n, based on prescribed conditions. Here, details of the prescribed conditions in S600 will be described in FIG. 7.

(S601) The terminal apparatus 1 performs any processing of S602 and S603, based at least on whether or not the subframe q in the secondary cell is a first prescribed subframe for the HARQ-ACK transmission in the subframe n using PUCCH format 1b with channel selection. Details of S601 will be described in FIG. 8.

(S602) The terminal apparatus 1 transmits the HARQ-ACK by using the HARQ-ACK PUCCH resource 440 in the subframe n in the primary cell. The terminal apparatus 1 transmits the HARQ-ACK by using a first transmission method (transmission method of HARQ-ACK with PUCCH format 1b with channel selection for FDD) in the HARQ-ACK PUCCH resource 440. The terminal apparatus 1 may receive the PDSCH in the subframe q in the secondary cell. The terminal apparatus 1 may not receive the PDSCH in the subframe q in the secondary cell.

(S603) The terminal apparatus 1 transmits the HARQ-ACK by using the HARQ-ACK PUCCH resource 440A in the subframe n in the primary cell. Here, the HARQ-ACK PUCCH resource 440A may be part of the HARQ-ACK PUCCH resource 440. The terminal apparatus 1 transmits the HARQ-ACK by using a second transmission method (transmission method of HARQ-ACK with PUCCH format 1a or 1b for FDD) in the HARQ-ACK PUCCH resource

440A. The terminal apparatus 1 does not receive the PDSCH in the subframe q in the secondary cell.

The base station apparatus 3 may determine that the scheduling request is a negative scheduling request, based on the reception of the HARQ-ACK in the PUCCH 440.

FIG. 7 is a diagram illustrating an example of a relationship between the subframe q and the subframe n in S600 of FIG. 6 according to the present embodiment.

In FIG. 7, the subframe q may be given based on whether or not the higher layer parameter shortProcessingTime for the secondary cell is configured for the terminal apparatus 1. For example, (Case AAA) in a case that the higher layer parameter shortProcessingTime for the secondary cell is not configured for the terminal apparatus 1, q is n−4. In other words, in this case, the subframe q in the secondary cell is a subframe four subframes prior to the subframe n in which the HARQ-ACK transmission is performed. (Case BBB) In a case that the higher layer parameter shortProcessingTime for the secondary cell is configured for the terminal apparatus 1, q is n−3. In other words, in this case, the subframe q in the secondary cell is a subframe three subframes prior to the subframe n in which the HARQ-ACK transmission is performed. q may be $n-k_{ps}$.

FIG. 8 is a diagram illustrating an example of selecting an HARQ-ACK transmission method in S601 of FIG. 6 according to the present embodiment. In FIG. 8, in a case that the subframe q in the secondary cell is not any of the first prescribed subframes for the HARQ-ACK transmission in the subframe n using PUCCH format 1b with channel selection, the terminal apparatus 1 performs S602 processing. In a case that the subframe q in the secondary cell is any of the first prescribed subframes for the HARQ-ACK transmission in the subframe n using PUCCH format 1b with channel selection, the terminal apparatus 1 performs S603 processing.

Here, the first prescribed subframes may include an uplink subframe. The first prescribed subframes may include a special subframe of a prescribed configuration. The prescribed configuration may be configuration 0 or 5 in a case that normal CP is configured for the downlink. The prescribed configuration may be configuration 0 or 4 in a case that extended CP is configured for the downlink. The uplink subframe and the special subframe may be indicated by a higher layer parameter TDD-config. The special subframe may be constituted by a Downlink Pilot Time Slot (DwPTS), a Guard Period (GP), and an Uplink Pilot Time Slot (UpPTS). The higher layer parameter TDD-config includes information for indicating a configuration of a special subframe. The configuration of the special subframe is related to at least the length of the DwPTS, the length of the GP, and/or the length of the UpPTS.

Hereinafter, the first transmission method in S602 (transmission method of HARQ-ACK with PUCCH format 1b with channel selection for FDD) will be described below.

For the first transmission method, the terminal apparatus 1 transmits bits b (0) and b (1) in the PUCCH resource $n^{(1)}_{PUCCH}$ in the subframe n by using PUCCH format 1b with channel selection. The terminal apparatus 1 may select one PUCCH resource $n^{(1)}_{PUCCH}$ from four resource $\{n^{(1)}_{PUCCH,0}, n^{(1)}_{PUCCH,1}, n^{(1)}_{PUCCH,2}, n^{(1)}_{PUCCH,3}\}$ included in the HARQ-ACK PUCCH resource 440 in accordance with HARQ-ACK (0), HARQ-ACK (1), HARQ-ACK (2), and HARQ-ACK (3). The terminal apparatus 1 may set the value of b (0) and the value of b (1) in accordance with HARQ-ACK (0), HARQ-ACK (1), HARQ-ACK (2), and HARQ-ACK (3). In the first transmission method, the terminal apparatus 1 generates one QPSK modulation symbol from b (0) and b (1), and transmits the one modulation symbol by using PUCCH format 1b.

FIG. 9 is a diagram illustrating an example of mapping between HARQ-ACK (j) and PUCCH resource $n^{(1)}_{sPUCCH}$ and b (0) b (1) for the first transmission method according to the present embodiment. For example, in a case that each of the HARQ-ACK (0), the HARQ-ACK (1), the HARQ-ACK (2), and the HARQ-ACK (3) are ACK, the terminal apparatus 1 may select $n^{(1)}_{PUCCH,1}$ as the PUCCH resource $n^{(1)}_{PUCCH}$, and may set each of b (0) and b (1) to 1.

In other words, for the first transmission method, the base station apparatus 3 can know the HARQ-ACK corresponding to each of the PDSCH 420 and the PDSCH 430, based on b (0) and b (1) detected in the HARQ-ACK PUCCH resource $n^{(1)}_{PUCCH}$. Specifically, the base station apparatus 3 can know the HARQ-ACK for each of the transport blocks 421, 422, 431, and 432, based on b (0) and b (1) detected in the HARQ-ACK PUCCH resource $n^{(1)}_{PUCCH}$.

Hereinafter, the second transmission method in S603 (transmission method of HARQ-ACK with PUCCH format 1a or 1b for FDD) will be described below.

In a case that the scheduling request is a negative scheduling request, the terminal apparatus 1 transmits the bit b (0) or bits b (0) b (1) in the PUCCH resource $n^{(1)}_{PUCCH}$ (PUCCH 440A) in the subframe n by using PUCCH format 1a or 1b. For example, in a case that the scheduling request is a negative scheduling request, the terminal apparatus 1 may transmit the bit b (0) in the PUCCH resource $n^{(1)}_{PUCCH}$ (PUCCH 440A) in the subframe n by using PUCCH format 1a. In a case that the scheduling request is a negative scheduling request, the terminal apparatus 1 may transmit the bits b (0) b (1) in the PUCCH resource $n^{(1)}_{PUCCH}$ (PUCCH 440A) in the subframe n by using PUCCH format 1b. The PUCCH resource $n^{(1)}_{PUCCH}$ (PUCCH 440A) may be given based on at least (i) the minimum (first) CCE number in CCEs configuring the PDCCH to schedule the PDSCH in the subframe $n-k_{pp}$ (subframe 400) in the primary cell, and (ii) a cell-specific parameter (higher layer parameter). The PUCCH 440A may be the PUCCH resource $n^{(1)}_{PUCCH,0}$.

For the second transmission method, the HARQ-ACK transmitted may include the HARQ-ACK (0), and may not include the HARQ-ACK (1), the HARQ-ACK (2), and HARQ-ACK (3). In this case, the terminal apparatus 1 transmits the HARQ-ACK by using PUCCH format 1a.

For the second transmission method, the HARQ-ACK transmitted may include the HARQ-ACK (0) and the HARQ-ACK (1) and may not include the HARQ-ACK (2) and the HARQ-ACK (3). In this case, the terminal apparatus 1 transmits the HARQ-ACK by using PUCCH format 1b. In other words, for the second transmission method, in a case that the scheduling request is a negative scheduling request and the HARQ-ACK is transmitted in the subframe n, the terminal apparatus 1 transmits HARQ-ACK for each transport block in the subframe $n-k_p$ in the primary cell in the HARQ-ACK PUCCH resource 440A.

For the second transmission method, the base station apparatus 3 can know the HARQ-ACK corresponding to the PDSCH 420, based on b (0) and b (1) detected in the HARQ-ACK PUCCH resource 440A. Specifically, the base station apparatus 3 can know the HARQ-ACK for each of the transport blocks 421 and 422, based on b (0) and b (1) detected in the HARQ-ACK PUCCH resource $n^{(1)}_{PUCCH}$.

Figure 10:
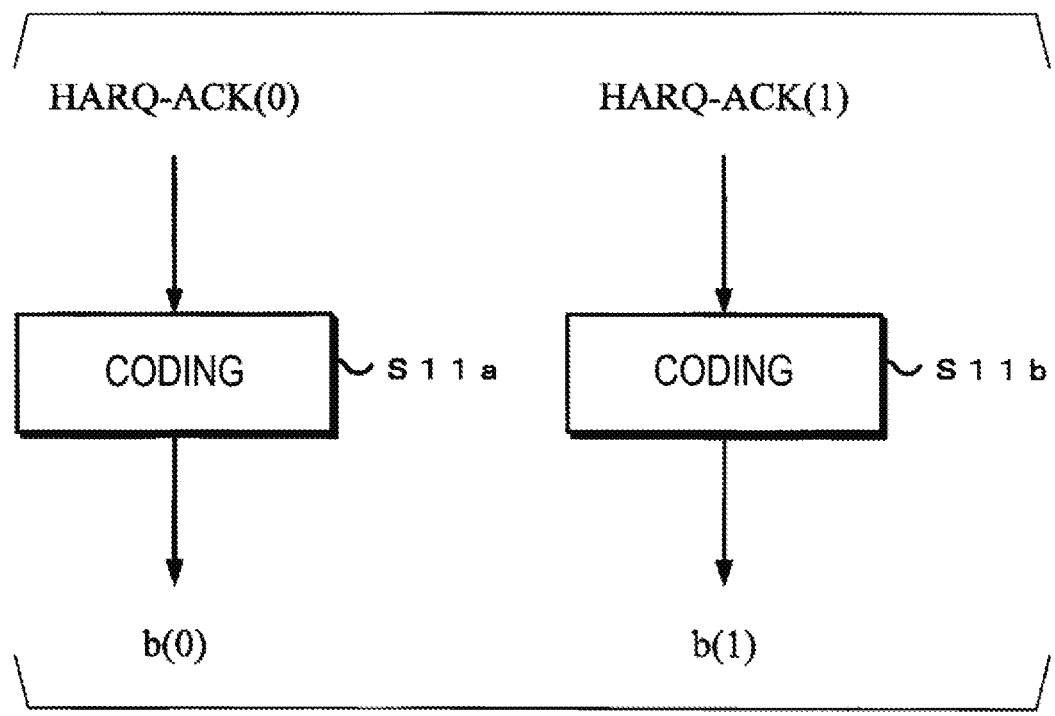
FIG. 10 is a diagram illustrating an example of an operation related to the second transmission method according to the present embodiment.

FIG. 10 is a diagram illustrating an example of an operation related to the second transmission method according to the present embodiment. In S11*a*, the terminal apparatus 1 encodes the HARQ-ACK (0) into a binary bit. In S11b, the terminal apparatus 1 encodes the HARQ-ACK (1) into a binary bit. HARQ-ACK bit for each transport is set to ACK or NACK. The terminal apparatus 1 encodes ACK as a binary "1" and encodes NACK as a binary "0".

In other words, in a case that the scheduling request is a negative scheduling request, the transport block is detected in the subframe $n-k_{pp}$ in the primary cell, and the scheduling request and the HARQ-ACK for the transport block are transmitted in the primary cell subframe n, the terminal apparatus 1 may select any of the first transmission method and the second transmission method as the HARQ-ACK transmission method, based on whether or not the subframe q in the secondary cell is a first prescribed subframe. In a case that the subframe q in the secondary cell is not any of the first prescribed subframes, the terminal apparatus 1 may select the first transmission method as the HARQ-ACK transmission method. In a case that the subframe q in the secondary cell is any of the first prescribed subframes, the terminal apparatus 1 may select the second transmission method as the HARQ-ACK transmission method.

In other words, in a case that the scheduling request is a negative scheduling request, the transport block is detected in the subframe $n-k_{pp}$ in the primary cell, and the scheduling request and the HARQ-ACK for the transport block are transmitted in the primary cell subframe n, the terminal apparatus 1 may select any of the first transmission method and the second transmission method as the HARQ-ACK transmission method, based on whether or not the subframe in the secondary cell is a first prescribed subframe. In a case that the subframe $n-k_{ps}$ in the secondary cell is not any of the first prescribed subframes, the terminal apparatus 1 may select the first transmission method as the HARQ-ACK transmission method. In a case that the subframe $n-k_{ps}$ in the secondary cell is any of the first prescribed subframes, the terminal apparatus 1 may select the second transmission method as the HARQ-ACK transmission method.

Hereinafter, in the present embodiment, a method for determining a transmission method of HARQ-ACK in a case that the scheduling request is a positive scheduling request, and HARQ-ACK for the transport block detected in the subframe i in the primary cell is transmitted in the primary cell subframe $i+k_{pp}$ will be described.

Figure 11:
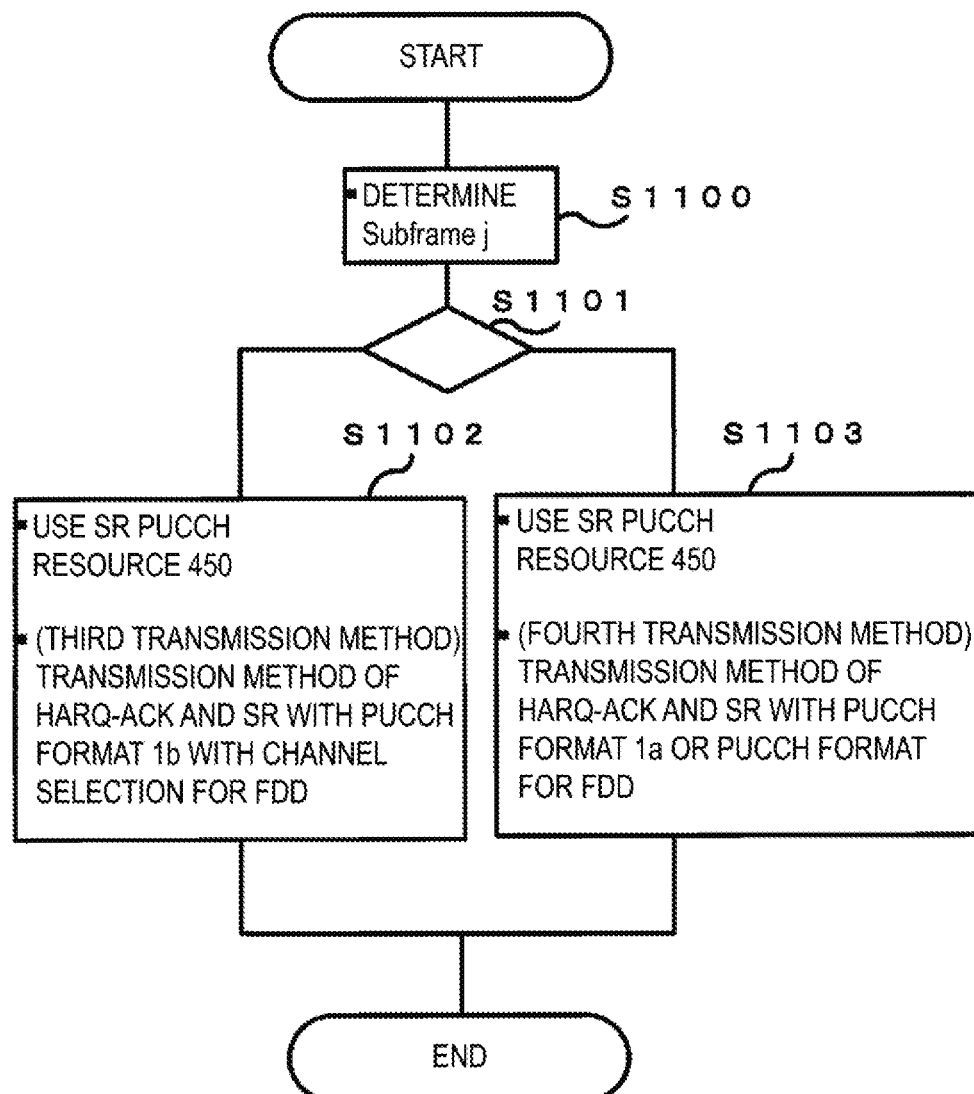
FIG. 11 is a flowchart for selecting a transmission method of HARQ-ACK in a primary cell subframe $i+k_{pp}$ in a case that the scheduling request according to the present embodiment is a positive scheduling request.

FIG. 11 is a flowchart for selecting a transmission method of HARQ-ACK in the primary cell subframe $i+k_{pp}$ in a case that the scheduling request according to the present embodiment is a positive scheduling request.

In FIG. 11, the PDSCH 420 may be received in the subframe i in the primary cell. The PDSCH 430 may be received in the subframe j in the secondary cell. In FIG. 11, in a case that the scheduling request is a positive scheduling request, the terminal apparatus 1 transmits the HARQ-ACK by using the SR PUCCH resource 450 allocated in the subframe $i+k_{pp}$ in the primary cell. In other words, FIG. 11 is a diagram illustrating a method for determining a transmission method of HARQ-ACK in a case that the scheduling request is a positive scheduling, and HARQ-ACK for the transport block detected in the subframe i in the primary cell is transmitted. In the present embodiment, the subframe j may be replaced with any of a subframe i−1, a subframe i, and a subframe i+1.

(S1100) The terminal apparatus 1 determines the subframe j. The terminal apparatus 1 may determine the relationship between the subframe i and the subframe j, based on prescribed conditions. Here, details of the prescribed conditions in S1100 will be described in FIG. 12.

(S1101) In a case that one or two transport blocks are detected in the primary cell in the subframe i by the terminal apparatus 1, the terminal apparatus 1 performs any processing of S1102 and S103, based on at least whether or not the subframe j in the secondary cell is a first prescribed subframe. Here, details of S1101 will be described in FIG. 14.

(S1102) The terminal apparatus 1 transmits the HARQ-ACK by using the SR PUCCH resource 450 in the subframe $i+k_{pp}$ (subframe 403). The terminal apparatus 1 transmits the HARQ-ACK by using a third transmission method (transmission method of HARQ-ACK and SR with PUCCH format 1b with channel selection for FDD) in the SR PUCCH resource 450. The subframe $i+k_{pp}$ (subframe 403) may be a subframe $j+k_{ps}$.

(S1103) The terminal apparatus 1 transmits the HARQ-ACK by using the SR PUCCH resource 450 in the subframe $i+k_{pp}$ (subframe 403). The terminal apparatus 1 transmits the HARQ-ACK by using a fourth transmission method (transmission method of HARQ-ACK and SR with PUCCH format 1a or 1b for FDD) in the SR PUCCH resource 450.

The base station apparatus 3 may determine that the scheduling request is a positive scheduling request, based on the reception of the HARQ-ACK in the SR PUCCH 450.

FIG. 12 is a diagram illustrating an example of a relationship between the subframe i and the subframe j in S1100 of FIG. 11 according to the present embodiment. The subframe j may be given based on at least (1) whether or not the higher layer parameter shortProcessingTime for the primary cell is configured for the terminal apparatus 1, (II) whether or not the higher layer parameter shortProcessingTime for the secondary cell is configured for the terminal apparatus 1, and (III) on which search space the PDCCH used to schedule the transport block in the primary cell is transmitted.

(Case CCC) In a case that the higher layer parameter shortProcessingTime for the primary cell is not configured for the terminal apparatus 1 and the higher layer parameter shortProcessingTime for the secondary cell is not configured for the terminal apparatus 1, j may be i.

Figure 13:
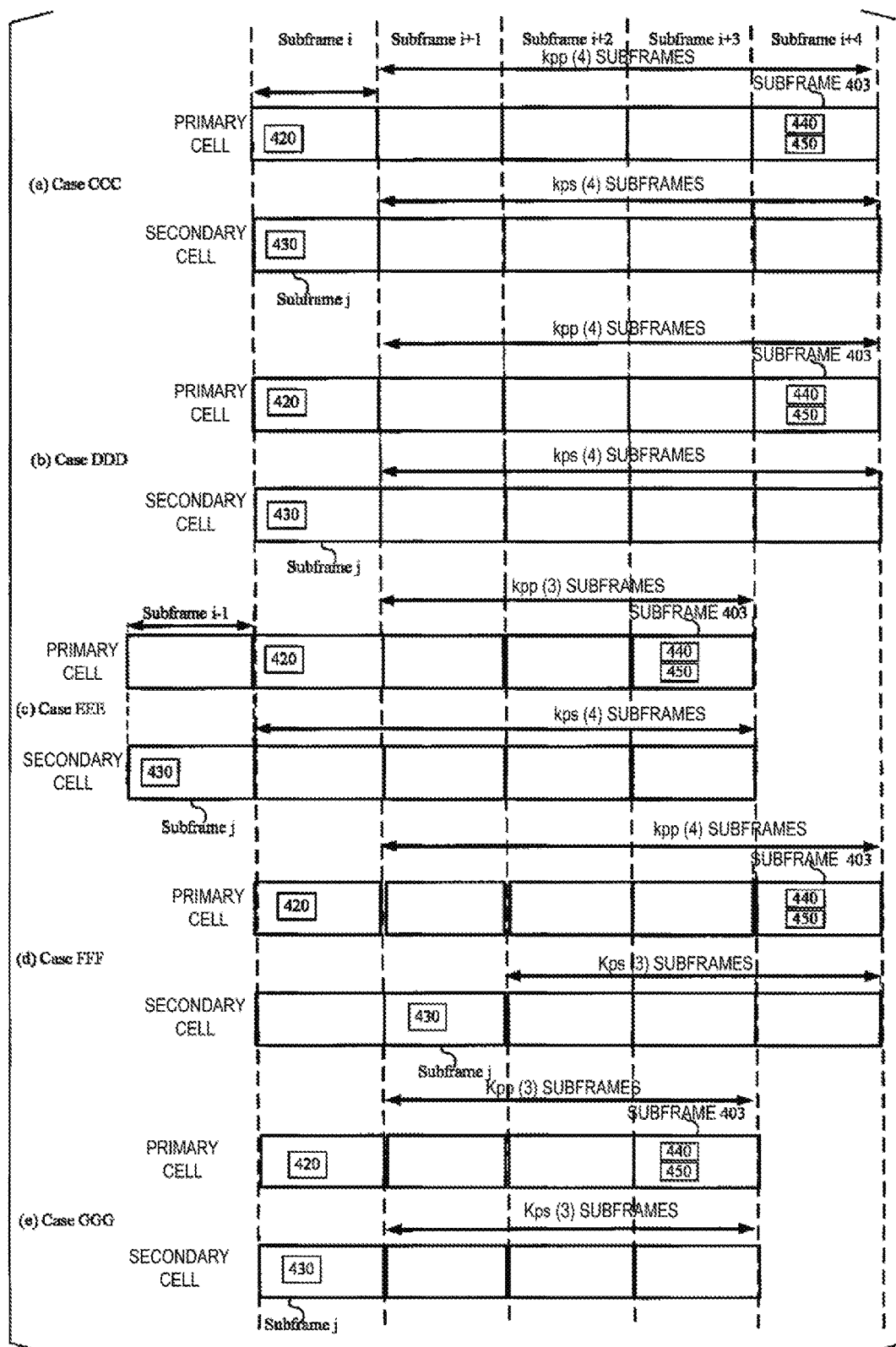
FIG. 13 is a diagram illustrating an example corresponding to each of the various cases in FIG. 12 according to the present embodiment.

FIG. 13 is a diagram illustrating an example corresponding to each of the various cases in FIG. 12 according to the present embodiment. FIG. 13(a) is a diagram illustrating an example of Case CCC in FIG. 12. In FIG. 13(a), the terminal apparatus 1 is not configured with the higher layer parameter shortProcessingTime for the primary cell. In FIG. 13(a), the terminal apparatus 1 is not configured with the higher layer parameter shortProcessingTime for the secondary cell. Referring to FIG. 13(a), in Case CCC, the subframe j is the subframe i. That is, in Case CCC, the PDSCH 420 may be received in the primary cell in the subframe i. The PDSCH 430 may be received in the secondary cell in the subframe i.

(Case DDD) In a case that the higher layer parameter shortProcessingTime for the primary cell is configured for the terminal apparatus 1, the higher layer parameter shortProcessingTime for the secondary cell is not configured for the terminal apparatus 1, and the PDCCH used to schedule the transport block in the primary cell is transmitted in the common search space in the subframe i, j may be i.

FIG. 13(b) is a diagram illustrating an example of Case DDD in FIG. 12. In FIG. 13(b), the terminal apparatus 1 is configured with the higher layer parameter shortProcessingTime for the primary cell. In FIG. 13(b), the terminal apparatus 1 is not configured with the higher layer parameter shortProcessingTime for the secondary cell. In FIG. 13(b), the PDCCH used to schedule the PDSCH 420 is transmitted in the common search space in the subframe i. Referring to FIG. 13(b), in Case DDD, the subframe j is the subframe i. That is, in Case DDD, the PDSCH 420 may be received in the primary cell in the subframe i. The PDSCH 430 may be received in the secondary cell in the subframe i.

(Case EEE) In a case that the higher layer parameter shortProcessingTime for the primary cell is configured for the terminal apparatus 1, the higher layer parameter short-ProcessingTime for the secondary cell is not configured for the terminal apparatus 1, and the PDCCH used to schedule the transport block in the primary cell is transmitted in the UE-specific search space in the subframe i, j may be i−1.

FIG. 13(c) is a diagram illustrating an example of Case EEE in FIG. 12. In FIG. 13(c), the terminal apparatus 1 is configured with the higher layer parameter shortProcessing-Time for the primary cell. In FIG. 13(c), the terminal apparatus 1 is not configured with the higher layer parameter shortProcessingTime for the secondary cell. In FIG. 13(c), the PDCCH used to schedule the PDSCH 420 is transmitted in the UE-specific search space in the subframe i. Referring to FIG. 13(c), in Case EEE, the subframe j is the subframe i−1. That is, in Case EEE, the PDSCH 420 may be received in the primary cell in the subframe i. The PDSCH 430 may be received in the secondary cell in the subframe i−1.

(Case FFF) In a case that the higher layer parameter shortProcessingTime for the primary cell is configured for the terminal apparatus 1, the higher layer parameter short-ProcessingTime for the secondary cell is configured for the terminal apparatus 1, and the PDCCH used to schedule the transport block in the primary cell is transmitted in the common search space in the subframe i, j may be i+1.

FIG. 13(d) is a diagram illustrating an example of Case FFF in FIG. 12. In FIG. 13(d), the terminal apparatus 1 is configured with the higher layer parameter shortProcessing-Time for the primary cell. In FIG. 13(d), the terminal apparatus 1 is configured with the higher layer parameter shortProcessingTime for the secondary cell. In FIG. 13(d), the PDCCH used to schedule the PDSCH 420 is transmitted in the common search space in the subframe i. Referring to FIG. 13(d), in Case FFF, the subframe j is the subframe i+1. That is, in Case FFF, the PDSCH 420 may be received in the primary cell in the subframe i. The PDSCH 430 may be received in the secondary cell in the subframe i+1.

(Case GGG) In a case that the higher layer parameter shortProcessingTime for the primary cell is configured for the terminal apparatus 1, the higher layer parameter short-ProcessingTime for the secondary cell is configured for the terminal apparatus 1, and the PDCCH used to schedule the transport block in the primary cell is transmitted in the UE-specific search space in the subframe i, j may be i.

FIG. 13(e) is a diagram illustrating an example of Case GGG in FIG. 12. In FIG. 13(e), the terminal apparatus 1 is configured with the higher layer parameter shortProcessing-Time for the primary cell. In FIG. 13(e), the terminal apparatus 1 is configured with the higher layer parameter shortProcessingTime for the secondary cell. In FIG. 13(e), the PDCCH used to schedule the PDSCH 420 is transmitted in the UE-specific search space in the subframe i. Referring to FIG. 13(e), in Case GGG, the subframe j is the subframe i. That is, in Case GGG, the PDSCH 420 may be received in the primary cell in the subframe i. The PDSCH 430 may be received in the secondary cell in the subframe i.

FIG. 14 is a diagram illustrating an example of selecting an HARQ-ACK transmission method in S1101 of FIG. 11 according to the present embodiment. In FIG. 14, in a case that one or two transport blocks are detected in the primary cell in the subframe i by the terminal apparatus 1 and the subframe j in the secondary cell is not any of the first prescribed subframes, the terminal apparatus 1 performs processing of S1102. For example, in a case that the two transport blocks 421 and 422 are detected in the primary cell in the subframe i by the terminal apparatus 1 and the subframe j in the secondary cell is not any of the first prescribed subframes, the terminal apparatus 1 performs processing of S1102. Here, the terminal apparatus 1 may or may not detect the transport block in the secondary cell in the subframe j. In other words, the terminal apparatus 1 may receive the PDSCH 430 or may not receive the PDSCH 430 in the secondary cell in the subframe j.

In a case that one or two transport blocks are detected in the primary cell in the subframe i by the terminal apparatus 1 and the subframe j in the secondary cell is any of the first prescribed subframes, the terminal apparatus 1 performs processing of S1103. For example, in a case that the two transport blocks 421 and 422 are detected in the primary cell in the subframe i by the terminal apparatus 1 and the subframe j in the secondary cell is any of the first prescribed subframes, the terminal apparatus 1 performs processing of S1103. Here, the terminal apparatus 1 does not detect the transport block in the secondary cell in the subframe j. The terminal apparatus 1 does not receive the PDSCH 430 in the secondary cell in the subframe j.

The prescribed subframes in FIG. 11 may be the same as the prescribed subframes in FIG. 8.

Hereinafter, the third transmission method in S1102 (transmission method of HARQ-ACK and SR with PUCCH format 1b with channel selection for FDD) will be described below.

For the third transmission method, in a case that the scheduling request is a positive scheduling request and the HARQ-ACK and the scheduling request are transmitted in the same subframe, the terminal apparatus 1 transmits 1 bit of HARQ-ACK per serving cell in the SR PUCCH resource 450. The HARQ-ACK bit for the primary cell is mapped to b (0). The HARQ-ACK bit for the secondary cell is mapped to b (1). Here, 1 bit of HARQ-ACK per serving cell is generated according to the following rules (1) to (3). In the rule (1), in a case that one transport block is received in the serving cell, the HARQ-ACK bit for the serving cell is an HARQ-ACK bit corresponding to the one transport block. In the rule (2), in a case that two transport blocks are received in the serving cell, the HARQ-ACK bit for the serving cell is generated by spatially bundling two HARQ-ACK bits corresponding to the two transport blocks. In the rule (3), in a case that PDSCH transmission for which HARQ-ACK response shall be provided is not detected in the serving cell, the HARQ-ACK bit for the serving cell is set to NACK. In the rule (3), in a case that PDSCH transmission or PDCCH transmission for which HARQ-ACK response shall be provided is not detected in the serving cell, the HARQ-ACK bit for the serving cell may be set to NACK. Here, the PDCCH transmission may be PDCCH transmission for indicating release of semi-persistent scheduling in the downlink.

Figure 15:
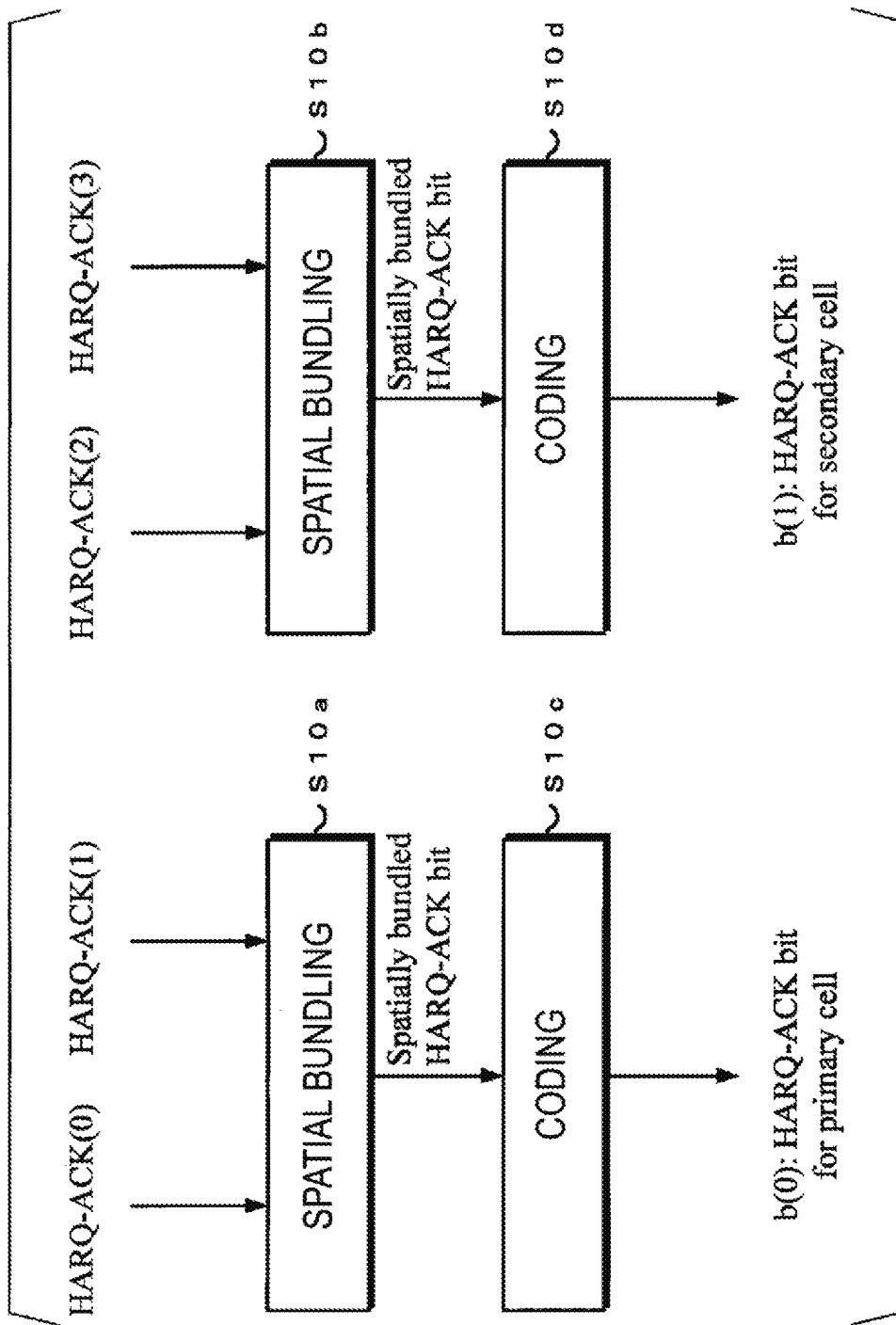
FIG. 15 is a diagram illustrating an example of an operation related to the rule (2) in the first transmission method according to the present embodiment.

FIG. 15 is a diagram illustrating an example of an operation related to the rule (2) in the first transmission method according to the present embodiment. In S10a, the terminal apparatus 1 generates the HARQ-ACK bit for the primary cell by spatially bundling the HARQ-ACK (0) and the HARQ-ACK (1). In S10b, the terminal apparatus 1 generates the HARQ-ACK bit for the secondary cell by spatially bundling the HARQ-ACK (2) and the HARQ-ACK (3). In each of S10a and S10b, in a case that each of the two HARQ-ACK bits input is ACK, the HARQ-ACK generated by the spatial bundling is set to ACK. In S10a and S10b, in a case that at least one of the two HARQ-ACK bits input is NACK, the HARQ-ACK generated by the spatial bundling is set to NACK.

An HARQ-ACK bit for each serving cell is set to ACK or NACK. The terminal apparatus 1 encodes an HARQ-ACK bit for each serving cell into a binary bit. The terminal apparatus 1 encodes ACK as a binary "1" and encodes NACK as a binary "0".

In other words, for the third transmission method, the base station apparatus 3 can know the HARQ-ACK for each of the primary cell and the secondary cell, based on the HARQ-ACK detected in the SR HARQ-ACK PUCC.

Hereinafter, the fourth transmission method in S1103 (transmission method of HARQ-ACK and SR with PUCCH format 1a or 1b for FDD) will be described below.

For the fourth transmission method, in a case that the scheduling request is a positive scheduling request and the HARQ-ACK and the scheduling request are transmitted in the subframe i+$k_{pp}$, the terminal apparatus 1 transmits the HARQ-ACK in the SR PUCCH resource 450. Here, the HARQ-ACK may include the HARQ-ACK (0) and the HARQ-ACK (1) and may not include the HARQ-ACK (2) and the HARQ-ACK (3). In this case, the terminal apparatus 1 transmits the HARQ-ACK by using PUCCH format 1b.

For the fourth transmission method, the HARQ-ACK transmitted may include the HARQ-ACK (0), and may not include the HARQ-ACK (1), the HARQ-ACK (2), and HARQ-ACK (3). In this case, the terminal apparatus 1 transmits the HARQ-ACK by using PUCCH format 1a.

In other words, for the fourth transmission method, in a case that the scheduling request is a positive scheduling request and the HARQ-ACK and the scheduling request are transmitted in the same subframe i+$k_{pp}$, the terminal apparatus 1 transmits HARQ-ACK for each transport block in the subframe i in the primary cell in the SR PUCCH resource 450 in the subframe i+$k_{pp}$. In the fourth transmission method, the HARQ-ACK (0) and the HARQ-ACK (1) are not spatially bundled.

For the fourth transmission method, as illustrated in FIG. 10, in S11a, the terminal apparatus 1 encodes the HARQ-ACK (0) into a binary bit. In S11b, the terminal apparatus 1 encodes the HARQ-ACK (1) into a binary bit. HARQ-ACK bit for each transport is set to ACK or NACK. The terminal apparatus 1 encodes ACK as a binary "1" and encodes NACK as a binary "0".

In other words, for the fourth transmission method, the base station apparatus 3 can know the HARQ-ACK for the primary cell, based on the HARQ-ACK detected in the SR HARQ-ACK PUCC. Specifically, for the fourth transmission method, the base station apparatus 3 can know the HARQ-ACK corresponding to each of the transport blocks 421 and 422 included in the PDSCH 420 in the primary cell, based on the HARQ-ACK detected in the SR HARQ-ACK PUCC.

In other words, in a case that the higher layer parameter shortProcessingTime for the primary cell is not configured for the terminal apparatus 1, the higher layer parameter shortProcessingTime for the secondary cell is not configured for the terminal apparatus 1, the scheduling request is a positive scheduling request, the transport block is detected in the subframe i in the primary cell, and the HARQ-ACK for the transport block and the scheduling request are transmitted, the terminal apparatus 1 may select the third transmission method in a case that the subframe i in the secondary cell is not any of the first prescribed subframes. In other words, in a case that the higher layer parameter shortProcessingTime for the primary cell is not configured for the terminal apparatus 1, the higher layer parameter shortProcessingTime for the secondary cell is not configured for the terminal apparatus 1, the scheduling request is a positive scheduling request, the transport block is detected in the subframe i in the primary cell, and the HARQ-ACK for the transport block and the scheduling request are transmitted, the terminal apparatus 1 may select the fourth transmission method in a case that the subframe i in the secondary cell is any of the first prescribed subframes.

In a case that the higher layer parameter shortProcessingTime for the primary cell is configured for the terminal apparatus 1, the higher layer parameter shortProcessingTime for the secondary cell is not configured for the terminal apparatus 1, the scheduling request is a positive scheduling request, the transport block is detected in the subframe i in the primary cell, the PDCCH used to schedule the transport block in the primary cell is transmitted in the common search space in the subframe i, and the HARQ-ACK for the transport block and the scheduling request are transmitted, the terminal apparatus 1 may select the third transmission method as the HARQ-ACK transmission method in a case that the subframe i in the secondary cell is not any of the first prescribed subframes. In other words, in a case that the higher layer parameter shortProcessingTime for the primary cell is configured for the terminal apparatus 1, the higher layer parameter shortProcessingTime for the secondary cell is not configured for the terminal apparatus 1, the scheduling request is a positive scheduling request, the transport block is detected in the subframe i in the primary cell, the PDCCH used to schedule the transport block in the primary cell is transmitted in the common search space in the subframe i, and the HARQ-ACK for the transport block and the scheduling request are transmitted, the terminal apparatus 1 may select the fourth transmission method in a case that the subframe i in the secondary cell is any of the first prescribed subframes.

In a case that the higher layer parameter shortProcessingTime for the primary cell is configured for the terminal apparatus 1, the higher layer parameter shortProcessingTime for the secondary cell is not configured for the terminal apparatus 1, the scheduling request is a positive scheduling request, the transport block is detected in the subframe i in the primary cell, the PDCCH used to schedule the transport block in the primary cell is transmitted in the UE-specific search space in the subframe i, and the HARQ-ACK for the transport block and the scheduling request are transmitted, the terminal apparatus 1 may select the third transmission method as the HARQ-ACK transmission method in a case that the subframe i−1 in the secondary cell is not any of the first prescribed subframes. In other words, in a case that the higher layer parameter shortProcessingTime for the primary cell is configured for the terminal apparatus 1, the higher layer parameter shortProcessingTime for the secondary cell is not configured for the terminal apparatus 1, the scheduling request is a positive scheduling request, the transport block is detected in the subframe i in the primary cell, the PDCCH used to schedule the transport block in the primary cell is transmitted in the UE-specific search space in the subframe i, and the HARQ-ACK for the transport block and the scheduling request are transmitted, the terminal apparatus 1 may select the fourth transmission method in a case that the subframe i−1 in the secondary cell is any of the first prescribed subframes.

In a case that the higher layer parameter shortProcessingTime for the primary cell is configured for the terminal apparatus 1, the higher layer parameter shortProcessingTime for the secondary cell is configured for the terminal apparatus 1, the scheduling request is a positive scheduling request, the transport block is detected in the subframe i in the primary cell, the PDCCH used to schedule the transport block in the primary cell is transmitted in the common search space in the subframe i, and the HARQ-ACK for the transport block and the scheduling request are transmitted, the terminal apparatus 1 may select the third transmission method as the HARQ-ACK transmission method in a case that the subframe i+1 in the secondary cell is not any of the first prescribed subframes. In other words, in a case that the higher layer parameter shortProcessingTime for the primary cell is configured for the terminal apparatus 1, the higher layer parameter shortProcessingTime for the secondary cell is configured for the terminal apparatus 1, the scheduling request is a positive scheduling request, the transport block is detected in the subframe i in the primary cell, the PDCCH used to schedule the transport block in the primary cell is transmitted in the common search space in the subframe i, and the HARQ-ACK for the transport block and the scheduling request are transmitted, the terminal apparatus 1 may select the fourth transmission method in a case that the subframe i+1 in the secondary cell is any of the first prescribed subframes.

In a case that the higher layer parameter shortProcessingTime for the primary cell is configured for the terminal apparatus 1, the higher layer parameter shortProcessingTime for the secondary cell is configured for the terminal apparatus 1, the scheduling request is a positive scheduling request, the transport block is detected in the subframe i in the primary cell, the PDCCH used to schedule the transport block in the primary cell is transmitted in the UE-specific search space in the subframe i, and the HARQ-ACK for the transport block and the scheduling request are transmitted, the terminal apparatus 1 may select the third transmission method as the HARQ-ACK transmission method in a case that the subframe i in the secondary cell is not any of the first prescribed subframes. In other words, in a case that the higher layer parameter shortProcessingTime for the primary cell is configured for the terminal apparatus 1, the higher layer parameter shortProcessingTime for the secondary cell is configured for the terminal apparatus 1, the scheduling request is a positive scheduling request, the transport block is detected in the subframe i in the primary cell, the PDCCH used to schedule the transport block in the primary cell is transmitted in the UE-specific search space in the subframe i, and the HARQ-ACK for the transport block and the scheduling request are transmitted, the terminal apparatus 1 may select the fourth transmission method in a case that the subframe i in the secondary cell is any of the first prescribed subframes.

Hereinafter, in the present embodiment, another method for determining a transmission method of HARQ-ACK in a case that the scheduling request is a positive scheduling request, and HARQ-ACK for the transport block detected in the subframe i in the primary cell is transmitted in the primary cell subframe $i+k_{pp}$ will be described.

Figure 16:
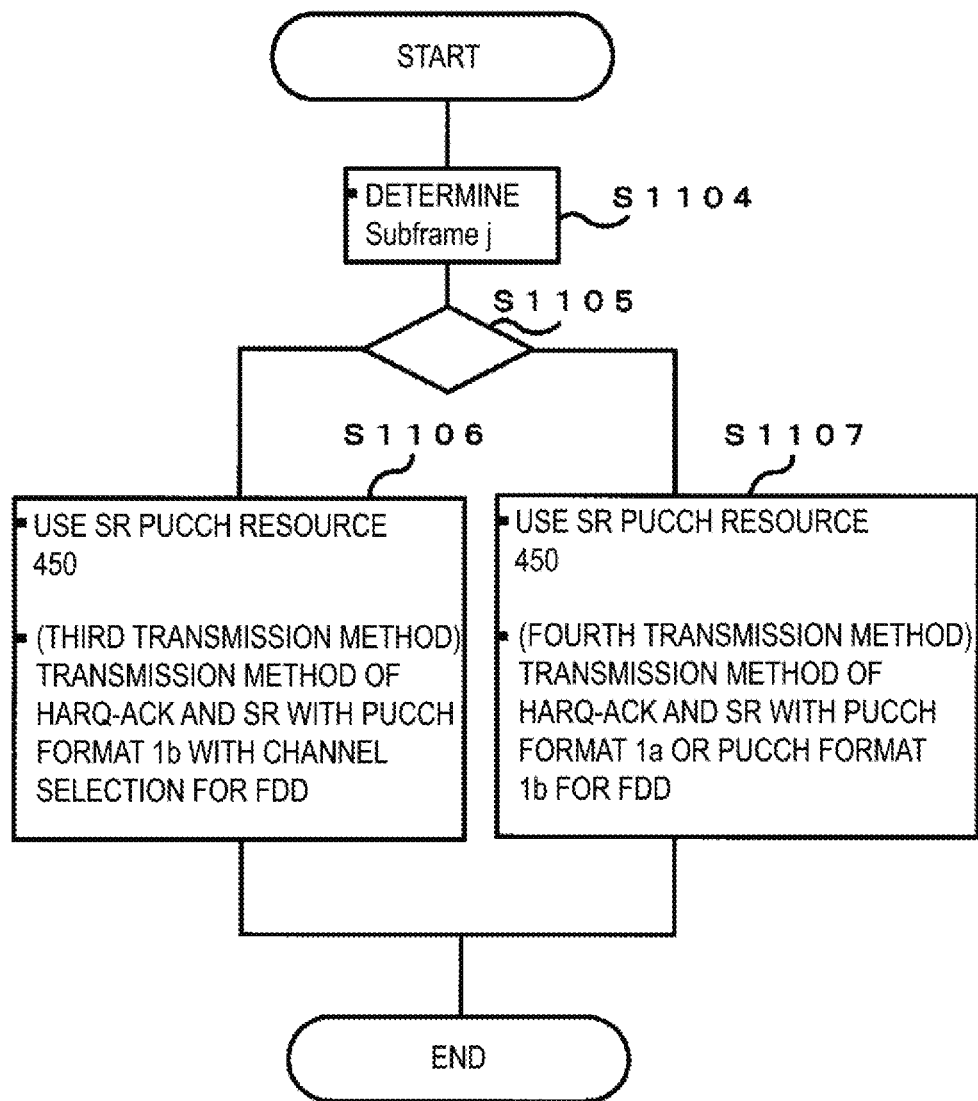
FIG. 16 is another flowchart for selecting a transmission method of HARQ-ACK in the primary cell subframe $i+k_{pp}$ in a case of the positive scheduling request according to the present embodiment.

FIG. 16 is another flowchart for selecting a transmission method of HARQ-ACK in the primary cell subframe $i+k_{pp}$ in a case of a positive scheduling request according to the present embodiment. In other words, FIG. 16 is a diagram illustrating another method for determining a transmission method of HARQ-ACK in a case that the scheduling request is a positive scheduling request and the HARQ-ACK for the transport block detected in the subframe i in the primary cell is transmitted in the primary cell subframe $i+k_{pp}$.

Since S1104 in FIG. 16 is the same as S1100 in FIG. 11, the description thereof is omitted.

In FIG. 16, another method for determining a transmission method of HARQ-ACK may be given based on S1105.

(S1105) In a case that the terminal apparatus 1 detects one or two transport blocks in the primary cell in the subframe i, the terminal apparatus 1 performs any processing of S1106 and S1107, based on at least (A) whether or not the subframe j in the secondary cell is a first prescribed subframe, and (B) whether or not the condition in Case CCC is satisfied. As illustrated in FIG. 12, the condition in Case CCC being satisfied means that the higher layer parameter shortProcessingTime for the primary cell is not configured for terminal apparatus 1, and the higher layer parameter shortProcessingTime for the secondary cell is not configured for the terminal apparatus 1. The condition in Case CCC being not satisfied means that the higher layer parameter shortProcessingTime for either the primary cell or the secondary cell is configured for the terminal apparatus 1.

In a case that the terminal apparatus 1 detects one or two transport blocks in the primary cell in the subframe i, the subframe j in the secondary cell is any of the first prescribed subframes, and the condition in Case CCC is satisfied, the terminal apparatus 1 performs processing of S1107.

Even in a case that the terminal apparatus 1 detects one or two transport blocks in the primary cell in the subframe i, and the subframe j in the secondary cell is any of the first prescribed subframes, the terminal apparatus 1 performs processing of S1106 in a case that the condition in Case CCC is not satisfied.

In a case that the terminal apparatus 1 detects one or two transport blocks in the primary cell in the subframe i, the subframe j in the secondary cell is not any of the first prescribed subframes, and the condition in Case CCC is satisfied, the terminal apparatus 1 performs processing of S1106.

In a case that the terminal apparatus 1 detects one or two transport blocks in the primary cell in the subframe i, the subframe j in the secondary cell is not any of the first prescribed subframes, and the condition in Case CCC is satisfied, the terminal apparatus 1 performs processing of S1106.

Since S1106 in FIG. 16 is the same as S1102 in FIG. 11, the description thereof is omitted. Since S1107 in FIG. 16 is the same as S1103 in FIG. 11, the description thereof is omitted.

In the present embodiment, in S603 and S1103, the terminal apparatus 1 may generate one complex-valued symbol by modulating b (0) and transmit the one complex-valued symbol by using PUCCH format 1a. In S602, S603, S1102, and S1103, the terminal apparatus 1 may generate one complex-valued symbol by modulating b (0) b (1) and transmit the one complex-valued symbol by using PUCCH format 1b.

A configuration of a terminal apparatus 1 according to the present invention will be described below.

Figure 17:
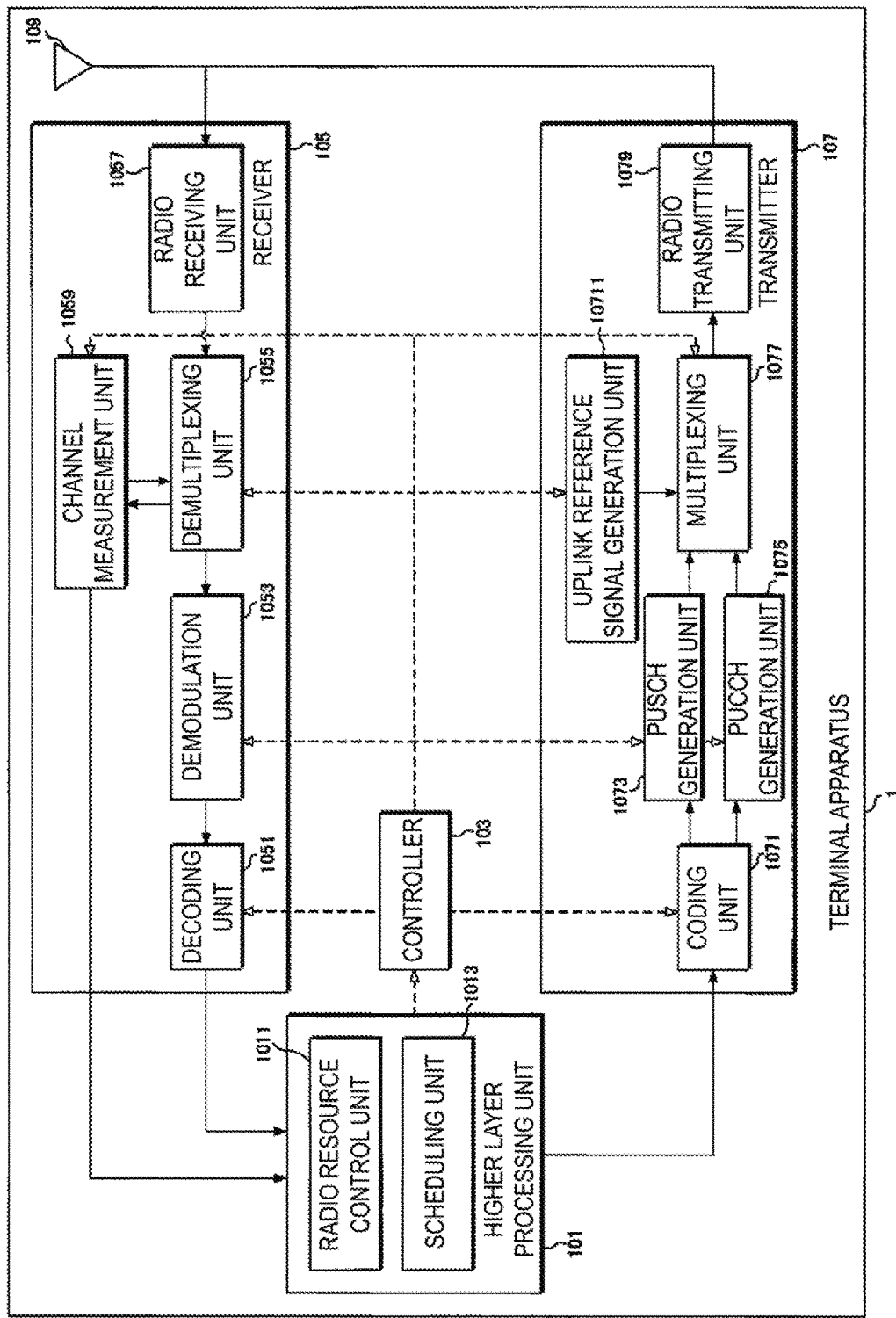
FIG. 17 is a schematic block diagram illustrating a configuration of a terminal apparatus 1 according to an aspect of the present invention.

FIG. 17 is a schematic block diagram illustrating a configuration of a terminal apparatus 1 according to an aspect of the present invention. As illustrated, the terminal apparatus 1 includes a higher layer processing unit 101, a controller 103, a receiver 105, a transmitter 107, and a transmit and receive antenna 109. The higher layer processing unit 101 includes a radio resource control unit 1011 and a scheduling unit 1013. The receiver 105 includes a decoding unit 1051, a demodulation unit 1053, a demultiplexing unit 1055, a radio receiving unit 1057, and a channel measurement unit 1059. The transmitter 107 includes a coding unit 1071, a PUSCH generation unit 1073, a PUCCH generation unit 1075, a multiplexing unit 1077, a radio transmitting unit 1079, and an uplink reference signal generation unit 10711.

The higher layer processing unit 101 outputs uplink data generated through a user operation or the like to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. The higher layer processing unit 101 generates control information for control of the receiver 105 and the transmitter 107, based on downlink control information or the like received on the PDCCH, and outputs the generated control information to the controller 103.

The radio resource control unit 1011 included in the higher layer processing unit 101 manages various kinds of configuration information of the terminal apparatus 1. For example, the radio resource control unit 1011 manages configured serving cells. The radio resource control unit 1011 generates information to be mapped to each uplink channel, and outputs the generated information to the transmitter 107. In a case that the received downlink data is successfully decoded, the radio resource control unit 1011 generates an ACK and outputs the ACK to the transmitter 107, and in a case that decoding of the received downlink data is failed, the radio resource control unit 1011 generates an NACK and outputs the NACK to the transmitter 107.

The scheduling unit 1013 included in the higher layer processing unit 101 stores downlink control information received via the receiver 105. The scheduling unit 1013 controls the transmitter 107 via the controller 103 so as to transmit the PUSCH or the sPUSCH according to a received uplink grant in the fourth subsequent subframe from the subframe in which the uplink grant has been received. The scheduling unit 1013 controls the receiver 105 via the controller 103 so as to receive the PDSCH or the sPDSCH according to a received downlink grant in the subframe in which a downlink grant has been received.

The controller 103 generates control signals for control of the receiver 105 and the transmitter 107, based on the control information from the higher layer processing unit 101. The controller 103 outputs the generated control signals to the receiver 105 and the transmitter 107 to control the receiver 105 and the transmitter 107.

In accordance with the control signals input from the controller 103, the receiver 105 demultiplexes, demodulates, and decodes reception signals received from the base station apparatus 3 through the transmit and receive antenna 109, and outputs information resulting from the decoding to the higher layer processing unit 101.

The radio receiving unit 1057 orthogonally demodulates downlink signals received via the transmit and receive antenna 109, and converts the orthogonally-demodulated analog signals to digital signals. The radio receiving unit 1057 performs Fast Fourier Transform (FFT) on the digital signals and extract signals of the frequency domain.

The demultiplexing unit 1055 demultiplexes the extracted signals into each of the PDCCH, the sPDSCH, the PCFICH, the PDSCH, the sPDSCH, and downlink reference signals. The demultiplexing unit 1055 outputs, to the channel measurement unit 1059, the downlink reference signals resulting from the demultiplexing.

The demodulation unit 1053 demodulates the PDCCH, the sPDCCH, the PDSCH, and the sPDSCH by using a modulation scheme such as QPSK, 16 Quadrature Amplitude Modulation (QAM), 64 QAM, and the like, and outputs the result of the demodulation to the decoding unit 1051.

The decoding unit 1051 decodes the downlink data and outputs, to the higher layer processing unit 101, the decoded downlink data. The channel measurement unit 1059 calculates a downlink channel estimate value from the downlink reference signals and outputs the calculated downlink channel estimate value to the demultiplexing unit 1055. The channel measurement unit 1059 calculates channel state information and outputs the channel state information to the higher layer processing unit 101.

The transmitter 107 generates uplink reference signals in accordance with the control signals input from the controller 103, encodes and modulates the uplink data or the uplink control information input from the higher layer processing unit 101, multiplexes the PUCCH, the PUSCH, and the generated uplink reference signals, and transmits the signals resulting from the multiplexing to the base station apparatus 3 through the transmit and receive antenna 109.

The coding unit 1071 encodes the uplink control information and the uplink data input from the higher layer processing unit 101 and outputs the coded bits to the PUSCH generation unit and/or the PUCCH generation unit.

The PUSCH generation unit 1073 modulates the coded bits hi input from the coding unit 1071 to generate modulation symbols, generate signals of the PUSCH/sPUSCH by performing DFT on the modulation symbols, and output the signals of the PUSCH/sPUSCH resulting from DFT to the multiplexing unit 1077.

The PUCCH generation unit 1075 generates signals of the PUCCH/sPUCCH, based on the coded bits $q_i/g_i$ and/or SR input from the coding unit 1071, and outputs the generated signals of the PUCCH/sPUCCH to the multiplexing unit 1077.

The uplink reference signal generation unit 10711 generates uplink reference signals and outputs the generated uplink reference signals to the multiplexing unit 1077.

The multiplexing unit 1075 multiplexes the signals input from the PUSCH generation unit 1073 and/or the signals input from the PUCCH generation unit 1075 and/or the uplink reference signals input from the uplink reference signal generation unit 10711 into uplink resource elements for each transmit antenna port according to the control signals input from the controller 103.

The radio transmitting unit 1077 performs Inverse Fast Fourier Transform (IFFT) on the multiplexed signals, modulates in an SC-FDMA scheme, generates baseband digital signals, converts the baseband digital signals into analog signals, generates in-phase components and orthogonal components of an intermediate frequency from the analog signals, removes frequency components unnecessary for the intermediate frequency band, converts (up-converts) the signals of the intermediate frequency into signals of a high frequency, removes unnecessary frequency components, performs power amplification, and outputs the final result to the transmit and receive antenna 109 for transmission.

A configuration of a base station apparatus 3 according to the present invention will be described below.

Figure 18:
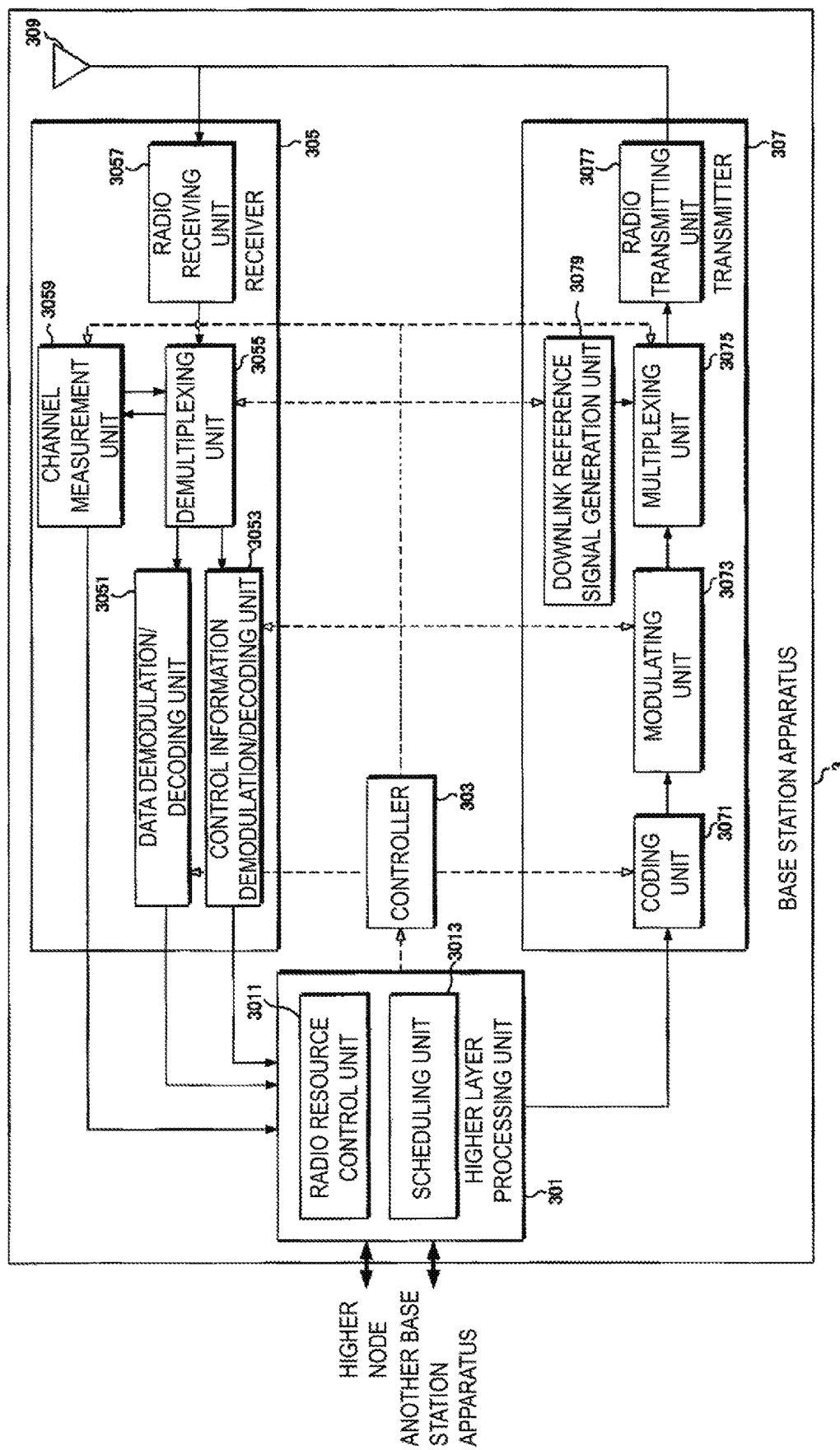
FIG. 18 is a schematic block diagram illustrating a configuration of a base station apparatus 3 according to an aspect of the present invention.

FIG. 18 is a schematic block diagram illustrating a configuration of a base station apparatus 3 according to an aspect of the present invention. As illustrated, the base station apparatus 3 includes a higher layer processing unit 301, a controller 303, a receiver 305, a transmitter 307, and a transmit and receive antenna 309. The higher layer processing unit 301 includes a radio resource control unit 3011 and a scheduling unit 3013. The receiver 305 includes a data demodulation/decoding unit 3051, a control information demodulation/decoding unit 3053, a demultiplexing unit 3055, a radio receiving unit 3057, and a channel measurement unit 3059. The transmitter 307 includes a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. The higher layer processing unit 301 generates control information for control of the receiver 305 and the transmitter 307, and outputs the generated control information to the controller 303.

The radio resource control unit 3011 included in the higher layer processing unit 301 generates or acquires from a higher node, downlink data mapped to the PDSCH of the downlink, RRC signals, and MAC Control Elements (CEs), and outputs the downlink data, the RRC signals, and the MAC CEs to the HARQ control unit 3013. The radio resource control unit 3011 manages various kinds of configuration information for each mobile station apparatus 1. For example, the radio resource control unit 3011 manages serving cells configured for a mobile station apparatus 1, and the like.

The scheduling unit 3013 included in the higher layer processing unit 301 manages radio resources of the PUSCH, the sPUSCH, the PUCCH, and the sPUCCH allocated to the mobile station apparatus 1. In a case that radio resources of the PUSCH or the sPUSCH are allocated to the mobile station apparatus 1, the scheduling unit 3013 generates an uplink grant for indicating the allocation of the radio resources of the PUSCH or the sPUSCH, and outputs the generated uplink grant to the transmitter 307.

The controller 303 generates control signals for control of the receiver 305 and the transmitter 307, based on the control information from the higher layer processing unit 301. The controller 303 outputs the generated control signals to the receiver 305 and the transmitter 307 to control the receiver 305 and the transmitter 307.

In accordance with the control signals input from the controller 303, the receiver 305 demultiplexes, demodulates, and decodes the reception signals received from the mobile station apparatus 1 through the transmit and receive antenna 309, and outputs the information resulting from the decoding to the higher layer processing unit 301.

The radio receiving unit 3057 orthogonally demodulates the uplink signals received via the transmit and receive antenna 309 and converts the orthogonally-demodulated analog signals into digital signals. The radio receiving unit 3057 performs Fast Fourier Transform (FFT) on the digital signals, extracts signals of the frequency domain, and outputs the resulting signals to the demultiplexing unit 3055.

The demultiplexing unit 1055 demultiplexes the signals input from the radio receiving unit 3057 into signals such as the PUCCH, the sPUCCH, the PUSCH, the sPUSCH, and uplink reference signals. Note that, the demultiplexing is performed based on radio resource allocation information that is determined in advance by the base station apparatus 3 in the radio resource control unit 3011 and is included in the uplink grant notified to each of the mobile station apparatuses 1. The demultiplexing unit 3055 performs compensation for channels of the PUCCH, the sPUCCH, the PUSCH, and the sPUSCH, from the channel estimate values input from the channel measurement unit 3059. The demultiplexing unit 3055 outputs, to the channel measurement unit 3059, the uplink reference signals resulting from the demultiplexing.

The demultiplexing unit 3055 acquires modulation symbols of the uplink data and modulation symbols of the uplink control information (HARQ-ACK) from the signals of the PUCCH, the sPUCCH, the PUSCH, and the sPUSCH that are demultiplexed. The demultiplexing unit 3055 outputs the modulation symbols of the uplink data acquired from the signals of the PUSCH or the sPUSCH to the data demodulation/decoding unit 3051. The demultiplexing unit 3055 outputs the modulation symbols of the uplink control information (HARQ-ACK) acquired from the signals of the PUCCH, the signals of the sPUCCH, the signals of the PUSCH, or the signals of the sPUSCH to the control information demodulation/decoding unit 3053.

The channel measurement unit 3059 measures channel estimate values, channel quality, and the like, from the uplink reference signals input from the demultiplexing unit 3055, and outputs the measurement results to the demultiplexing unit 3055 and the higher layer processing unit 301.

The data demodulation/decoding unit 3051 decodes uplink data from the modulation symbols of the uplink data input from the demultiplexing unit 3055. The data demodulation/decoding unit 3051 outputs the decoded uplink data to the higher layer processing unit 301.

The control information demodulation/decoding unit 3053 decodes HARQ-ACK from the modulation symbols of the HARQ-ACK input from the demultiplexing unit 3055. The control information demodulation/decoding unit 3053 outputs the decoded HARQ-ACK to the higher layer processing unit 301.

The transmitter 307 generates downlink reference signals in accordance with the control signals input from the controller 303, encodes and modulates the downlink control information and the downlink data that are input from the higher layer processing unit 301, multiplexes the PDCCH, the sPDCCH, the PDSCH, the sPDSCH, and the downlink reference signals, and transmits the results of the multiplexing to the mobile station apparatus 1 through the transmit and receive antenna 309.

The coding unit 3071 encodes the downlink control information and the downlink data input from the higher layer processing unit 301. The modulation unit 3073 modulates the coded bits input from the coding unit 3071, in compliance with a modulation scheme such as BPSK, QPSK, 16 QAM, or 64 QAM.

The downlink reference signal generation unit 3079 generates downlink reference signals. The multiplexing unit 3075 multiplexes the modulation symbols and the downlink reference signals of each channel.

The radio transmitting unit 3077 performs Inverse Fast Fourier Transform (IFFT) on the multiplexed modulation symbols or the like, modulates in an OFDM scheme, generates baseband digital signals, converts the baseband digital signals into analog signals, generates in-phase components and orthogonal components of an intermediate frequency from the analog signals, removes frequency components unnecessary for the intermediate frequency band, converts (up-converts) the signals of the intermediate frequency into signals of a high frequency, removes unnecessary frequency components, performs power amplification, and outputs the final result to the transmit and receive antenna 309 for transmission.

Each of the units included in the terminal apparatus 1 and the base station apparatus 3 may be constituted as a circuit. One or more units in FIG. 17 and FIG. 18 may be configured as at least one processor and a memory coupled to the at least one processor.

Hereinafter, various aspects of the terminal apparatus 1 and the base station apparatus 3 according to the present embodiment will be described.

(1) A first aspect of the present embodiment is a terminal apparatus 1 for communicating with a base station apparatus 3 by using two serving cells including one primary cell and one secondary cell, the terminal apparatus 1 including: a receiver 105 configured to receive a transport block; and a transmitter 107 configured to select a first transmission method in a case that a transport block is received in the primary cell in a subframe $n-k_{pp}$, a scheduling request is a negative scheduling request, HARQ-ACK and the scheduling request are transmitted in a subframe n, and a subframe q in the secondary cell does not correspond to any of first prescribed subframes, the transmitter 107 being configured to select a second transmission method in a case that a subframe j in the secondary cell corresponds to one of the first prescribed subframes, and the transmitter 107 being configured to transmit first HARQ-ACK in a PUCCH resource for the HARQ-ACK by using a transmission method selected, wherein the first transmission method is a method for transmitting HARQ-ACK with PUCCH format 1b with channel selection for FDD, the second transmission method is a method for transmitting HARQ-ACK with PUCCH format 1a or 1b for FDD, the subframe q may be given by n−4 in a case that a higher layer parameter shortProcessingTime for the secondary cell is not configured for the terminal apparatus 1, and the subframe q may be given by n−3 in a case that the higher layer parameter shortProcessingTime for the secondary cell is configured for the terminal apparatus 1.

(2) A second aspect of the present embodiment is a base station apparatus 3 for communicating with a terminal apparatus 1 by using two serving cells including one primary cell and one secondary cell, the base station apparatus 3 including: a transmitter 307 configured to transmit a transport block; and a receiver 305 configured to select a first transmission method in a case that a transport block is transmitted in the primary cell in a subframe $n-k_{pp}$, a scheduling request is a negative scheduling request, HARQ-ACK for the transport block and the scheduling request are transmitted in a subframe n, and a subframe q in the secondary cell does not correspond to any of first prescribed subframes, select a second transmission method in a case that a subframe j in the secondary cell corresponds to one of the first prescribed subframes, and receive first HARQ-ACK in a PUCCH resource for HARQ-ACK transmission by using a transmission method selected, wherein the first transmission method is a method for transmitting HARQ-ACK with PUCCH format 1b with channel selection for FDD, the second transmission method is a method for transmitting HARQ-ACK with PUCCH format 1a or 1b for FDD, the subframe q may be given by n−4 in a case that a higher layer parameter shortProcessingTime for the secondary cell is not configured for the terminal apparatus 1, and the subframe q may be given by n−3 in a case that the higher layer parameter shortProcessingTime for the secondary cell is configured for the terminal apparatus 1.

(3) A third aspect of the present embodiment is a terminal apparatus 1 for communicating with a base station apparatus 3 by using two serving cells including one primary cell and one secondary cell, the terminal apparatus 1 including: a receiver 105 configured to receive a transport block; and a transmitter 107 configured to select a third transmission method in a case that one or two transport blocks are received in the primary cell in a subframe i, a scheduling request is a positive scheduling request, HARQ-ACK and the scheduling request are transmitted in a subframe $i+k_{pp}$, and a subframe j in the secondary cell does not correspond to any of first prescribed subframes, select a fourth transmission method in a case that the subframe j in the secondary cell corresponds to one of the first prescribed subframes, and transmit second HARQ-ACK in a PUCCH resource for the scheduling request by using a transmission method selected, wherein the third transmission method is a method for transmitting HARQ-ACK and SR with PUCCH format 1b with channel selection for FDD, the fourth transmission method is a method for transmitting HARQ-ACK and SR with PUCCH format 1a or 1b for FDD, and the subframe j may be given based on at least (I) whether a higher layer parameter shortProcessingTime for the primary cell is configured for the terminal apparatus 1, (II) whether a higher layer parameter shortProcessingTime for the secondary cell is configured for the terminal apparatus 1, and (III) whether the PDCCH used to schedule the transport block(s) in the subframe i in the primary cell is transmitted in any search space.

(4) A fourth aspect of the present embodiment is a base station apparatus 3 for communicating with a terminal apparatus 1 by using two serving cells including one primary cell and one secondary cell, the base station apparatus 3 including: a transmitter 307 configured to transmit a transport block; and a receiver 107 configured to select a third transmission method in a case that one or two transport blocks are transmitted in the primary cell in a subframe i, a scheduling request is a positive scheduling request, HARQ-ACK and the scheduling request are received in a subframe $i+k_{pp}$, and a subframe j in the secondary cell does not correspond to any of first prescribed subframes, select a fourth transmission method in a case that the subframe j in the secondary cell corresponds to one of the first prescribed subframes, and receive second HARQ-ACK in a PUCCH resource for the scheduling request by using a transmission method selected, wherein the third transmission method is a method for transmitting HARQ-ACK and SR with PUCCH format 1b with channel selection for FDD, the fourth transmission method is a method for transmitting HARQ-ACK and SR with PUCCH format 1a or 1b for FDD, and the subframe j may be given based on at least (I) whether a higher layer parameter shortProcessingTime for the primary cell is configured for the terminal apparatus 1, (II) whether a higher layer parameter shortProcessingTime for the secondary cell is configured for the terminal apparatus 1, and (III) whether the PDCCH used to schedule the transport block(s) in the subframe i in the primary cell is transmitted in any search space.

(5) In each of the first, second, third, and fourth aspects of the present embodiment, the first prescribed subframes may include an uplink subframe, the first prescribed subframes may include a special subframe of a prescribed configuration, the prescribed configuration is configuration 0 or 5 in a case that normal CP is configured, and the prescribed configuration is configuration 0 or 4 in a case that extended CP is configured.

(6) In each of the third and fourth aspects of the present embodiment, the subframe j is given by i in a case that the higher layer parameter shortProcessingTime for the primary cell is not configured for the terminal apparatus 1, and the higher layer parameter shortProcessingTime for the secondary cell is not configured for the terminal apparatus 1.

(7) In each of the third and fourth aspects of the present embodiment, the subframe j is given by i in a case that the higher layer parameter shortProcessingTime for the primary cell is configured for the terminal apparatus 1, the higher layer parameter shortProcessingTime for the secondary cell is not configured for the terminal apparatus 1, and the PDCCH used to schedule the transport block in the primary cell is transmitted in a common search space in the subframe i.

(8) In each of the third and fourth aspects of the present embodiment, the subframe j is given by i−1 in a case that the higher layer parameter shortProcessingTime for the primary cell is configured for the terminal apparatus 1, the higher layer parameter shortProcessingTime for the secondary cell is not configured for the terminal apparatus 1, and the PDCCH used to schedule the transport block in the primary cell is transmitted in a UE-specific search space in the subframe i.

(9) In each of the third and fourth aspects of the present embodiment, the subframe j is given by i+1 in a case that the higher layer parameter shortProcessingTime for the primary cell is configured for the terminal apparatus 1, the higher layer parameter shortProcessingTime for the secondary cell is configured for the terminal apparatus 1, and the PDCCH used to schedule the transport block in the primary cell is transmitted in a common search space in the subframe i.

(10) In each of the third and fourth aspects of the present embodiment, the subframe j is given by i in a case that the higher layer parameter shortProcessingTime for the primary cell is configured for the terminal apparatus 1, the higher layer parameter shortProcessingTime for the secondary cell is configured for the terminal apparatus 1, and the PDCCH used to schedule the transport block in the primary cell is transmitted in a UE-specific search space in the subframe i.

According to the above, the terminal apparatus can transmit the uplink control information efficiently. The base station apparatus can receive the uplink control information efficiently.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiments according to an aspect of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiments may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS or hardware components such as peripheral devices. The "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. The program may be configured to realize some of the functions described above, and also may be configured to be capable of realizing the functions described above in combination with a program already recorded in the computer system.

The base station apparatus 3 according to the above-described embodiments may be achieved as an aggregation (apparatus group) including multiple apparatuses. Each of the apparatuses constituting such an apparatus group may include some or all portions of each function or each functional block of the base station apparatus 3 according to the above-described embodiments. The apparatus group is required to have a complete set of functions or functional blocks of the base station apparatus 3. The terminal apparatus 1 according to the above-described embodiments can also communicate with the base station apparatuses as the aggregation.

The base station apparatus 3 according to the above-described embodiments may serve as an Evolved Universal Terrestrial Radio Access Network (EUTRAN). The base station apparatus 3 according to the above-described embodiments may have some or all of the functions of a node higher than an eNodeB.

Some or all portions of each of the terminal apparatus 1 and the base station apparatus 3 according to the above-described embodiments may be typically achieved as an LSI which is an integrated circuit or may be achieved as a chip set. Each of the functional blocks of the terminal apparatus 1 and the base station apparatus 3 may be individually achieved as a chip, or some or all of the functional blocks may be integrated into a chip. A circuit integration technique is not limited to the LSI, and may be realized as a dedicated circuit or a general-purpose processor. In a case that a circuit integration technology by which the LSI is replaced appears with advances in semiconductor technology, it is also possible to use an integrated circuit based on the technology.

According to the above-described embodiments, the terminal apparatus has been described as an example of a communication apparatus, but the present invention is not limited to such a terminal apparatus, and is applicable to a terminal apparatus or a communication apparatus of a fixed-type or a stationary-type electronic device installed indoors or outdoors, for example, such as an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configurations are not limited to the embodiments, and include, for example, modifications to the design that falls within the scope without departing from the gist of the present invention. Various modifications are possible within the scope of one aspect of the present invention defined by claims, and embodiments that are made by suitably combining technical means disclosed according to the different embodiments are also included in the technical scope of the present invention. Configurations in which constituent elements, described in each embodiment above having mutually the same effects, are substituted for one another are also included in the technical scope of the present invention.

INDUSTRIAL APPLICABILITY

An aspect of the present invention can be utilized, for example, in a communication system, a communication apparatus (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
101 Higher layer processing unit
103 Controller
105 Receiver
107 Transmitter
301 Higher layer processing unit
303 Controller
305 Receiver
307 Transmitter
1011 Radio resource control unit
1013 Scheduling unit
3011 Radio resource control unit
3013 Scheduling unit

The invention claimed is:

1. A terminal apparatus for communicating with a base station apparatus by using at least two serving cells including one primary cell of FDD and one secondary cell of TDD, the terminal apparatus comprising:
a receiver configured to receive a transport block; and
a transmitter configured to
select a first transmission method in a case that a scheduling request is a negative scheduling request, HARQ-ACK for the transport block is transmitted in a subframe n, and a subframe q in the secondary cell does not correspond to any of first prescribed subframes,
select a second transmission method in a case that the scheduling request is a negative scheduling request, the HARQ-ACK for the transport block is transmitted in the subframe n, and the subframe q in the secondary cell corresponds to one of the first prescribed subframes, and
transmit the HARQ-ACK in a PUCCH resource for the HARQ-ACK by using a transmission method selected, wherein
the first transmission method is a method for transmitting HARQ-ACK with PUCCH format 1b with channel selection for FDD,
the second transmission method is a method for transmitting HARQ-ACK with PUCCH format 1a or 1b for FDD,
the subframe q is a subframe n−4 in a case that a higher layer parameter shortProcessingTime for the secondary cell is not configured, and
the subframe q is a subframe n−3 in a case that the higher layer parameter shortProcessingTime for the secondary cell is configured.

2. The terminal apparatus according to claim 1, wherein
the first prescribed subframes includes an uplink subframe and a special subframe of any of multiple prescribed configurations within a radio frame.

3. A base station apparatus for communicating with a terminal apparatus by using at least two serving cells including one primary cell of FDD and one secondary cell of TDD, the base station apparatus comprising:
a transmitter configured to transmit a transport block; and
a receiver configured to
select a first transmission method in a case that a scheduling request is a negative scheduling request, HARQ-ACK for the transport block is transmitted in a subframe n, and a subframe q in the secondary cell does not correspond to any of first prescribed subframes,
select a second transmission method in a case that the scheduling request is a negative scheduling request, the HARQ-ACK for the transport block is transmitted in the subframe n, and the subframe q in the secondary cell corresponds to one of the first prescribed subframes, and
receive the HARQ-ACK in a PUCCH resource for the HARQ-ACK, based on a transmission method selected, wherein
the first transmission method is a method for transmitting HARQ-ACK with PUCCH format 1b with channel selection for FDD,
the second transmission method is a method for transmitting HARQ-ACK with PUCCH format 1a or 1b for FDD,
the subframe q is a subframe n−4 in a case that a higher layer parameter shortProcessingTime for the secondary cell is not configured, and
the subframe q is a subframe n−3 in a case that the higher layer parameter shortProcessingTime for the secondary cell is configured.

4. The base station apparatus according to claim 3, wherein
the first prescribed subframes includes an uplink subframe and a special subframe of any of multiple prescribed configurations within a radio frame.

5. A communication method for a terminal apparatus for communicating with a base station apparatus by using at least two serving cells including one primary cell of FDD and one secondary cell of TDD, the communication method comprising the steps of:
receiving a transport block;
selecting a first transmission method in a case that a scheduling request is a negative scheduling request, HARQ-ACK for the transport block is transmitted in a subframe n, and a subframe q in the secondary cell does not correspond to any of first prescribed subframes;
selecting a second transmission method in a case that the scheduling request is a negative scheduling request, the HARQ-ACK for the transport block is transmitted in the subframe n, and the subframe q in the secondary cell corresponds to one of the first prescribed subframes; and
transmitting the HARQ-ACK in a PUCCH resource for the HARQ-ACK by using a transmission method selected, wherein
the first transmission method is a method for transmitting HARQ-ACK with PUCCH format 1b with channel selection for FDD,
the second transmission method is a method for transmitting HARQ-ACK with PUCCH format 1a or 1b for FDD,
the subframe q is a subframe n−4 in a case that a higher layer parameter shortProcessingTime for the secondary cell is not configured, and
the subframe q is a subframe n−3 in a case that the higher layer parameter shortProcessingTime for the secondary cell is configured.

6. A communication method for a base station apparatus for communicating with a terminal apparatus by using at least two serving cells including one primary cell of FDD and one secondary cell of TDD, the communication method comprising the steps of:

transmitting a transport block;
selecting a first transmission method in a case that a scheduling request is a negative scheduling request, HARQ-ACK for the transport block is transmitted in a subframe n, and a subframe q in the secondary cell does not correspond to any of first prescribed subframes;
selecting a second transmission method in a case that the scheduling request is a negative scheduling request, the HARQ-ACK for the transport block is transmitted in the subframe n, and the subframe q in the secondary cell corresponds to one of the first prescribed subframes; and
receiving the HARQ-ACK in a PUCCH resource for the HARQ-ACK, based on a transmission method selected, wherein
the first transmission method is a method for transmitting HARQ-ACK with PUCCH format 1b with channel selection for FDD,
the second transmission method is a method for transmitting HARQ-ACK with PUCCH format 1a or 1b for FDD,
the subframe q is a subframe n−4 in a case that a higher layer parameter shortProcessingTime for the secondary cell is not configured, and
the subframe q is a subframe n−3 in a case that the higher layer parameter shortProcessingTime for the secondary cell is configured.

* * * * *